(12) United States Patent
Zhu et al.

(10) Patent No.: US 8,026,399 B2
(45) Date of Patent: Sep. 27, 2011

(54) FRACTIONAL CONDENSATION PROCESSES, APPARATUSES AND SYSTEMS

(75) Inventors: Yizu Zhu, Lexington, MA (US); Johan van Walsem, Acton, MA (US)

(73) Assignee: Joule Unlimited Technologies, Inc., Cambridge, MA (US)

( * ) Notice: Subject to any disclaimer, the term of this patent is extended or adjusted under 35 U.S.C. 154(b) by 0 days.

(21) Appl. No.: 13/061,122

(22) PCT Filed: Jul. 28, 2010

(86) PCT No.: PCT/US2010/043574
§ 371 (c)(1),
(2), (4) Date: Feb. 25, 2011

(87) PCT Pub. No.: WO2011/017172
PCT Pub. Date: Feb. 10, 2011

(65) Prior Publication Data
US 2011/0184213 A1    Jul. 28, 2011

Related U.S. Application Data

(60) Provisional application No. 61/229,155, filed on Jul. 28, 2009, provisional application No. 61/231,960, filed on Aug. 6, 2009, provisional application No. 61/332,454, filed on May 7, 2010.

(51) Int. Cl.
*C07C 27/26* (2006.01)
(52) U.S. Cl. ........................................ 568/913
(58) Field of Classification Search .................. 568/913
See application file for complete search history.

(56) References Cited

U.S. PATENT DOCUMENTS

| 4,454,100 A | 6/1984 | Faatz |
| 5,897,690 A * | 4/1999 | McGrew ......................... 95/188 |
| 6,646,161 B1 | 11/2003 | Eck et al. |
| 6,679,939 B1 | 1/2004 | Thiel et al. |
| 6,755,975 B2 * | 6/2004 | Vane et al. .................... 210/640 |
| 2003/0114722 A1 | 6/2003 | Bradley |

FOREIGN PATENT DOCUMENTS
KR    10-0137416 B1    4/1998

OTHER PUBLICATIONS

Vane, Leland M. A review of pervaporation for product recovery from biomass fermentation processes. Journal of Chemical Technology and Biotechnology, 2005, vol. 80, 603-629.*
Vane et al. Separation of Vapor-Phase Alcohol/Water Mixtures via Fraction Condensation Using a Pilot-Scale Dephlegmator: Enhancement of the Pervaporation Process Separation Factor. Ind. Eng. Chem. Res., 2004, vol. 43, 173-183.*
Notification of Transmittal of the International Search Report and the Written Opinion of the International Searching Authority for Int'l Application No. PCT/US2010/043574; Date Mailed: Apr. 19, 2001.

* cited by examiner

*Primary Examiner* — Sikarl Witherspoon
(74) *Attorney, Agent, or Firm* — Chang B. Hong, Esq.

(57) ABSTRACT

The present invention provides fractional condensation apparatuses, systems and methods that can recover volatile products from highly diluted liquid and vapor feed mixtures with high purity and recovery yield, both in batch and continuous distillation, while being also designed to achieve low-cost and efficient recovery processes. Single apparatuses and columns can be connected to each other to expand or shrink the column length for desired separation. The apparatuses, systems and methods can be applied to separate mixtures with both narrow and wide boiling point ranges.

11 Claims, 13 Drawing Sheets

FRACTIONAL CONDENSATION PROCESSES, APPARATUSES AND SYSTEMS

RELATED APPLICATIONS

This application is the U.S. National Stage of International Application No. PCT/US2010/043574, filed Jul. 28, 2010, which designates the U.S., published in English, and claims the benefit of U.S. Provisional Application No. 61/229,155, filed Jul. 28, 2009, U.S. Provisional Application No. 61/231, 960, filed Aug. 6, 2009, and U.S. Provisional Application No. 61/332,454, filed on May 7, 2010. The entire teachings of the above applications are incorporated herein by reference.

BACKGROUND OF THE INVENTION

Product separation cost in the context of bioprocessing is a major contributor to the overall cost of any manufacturing technologies for conventional agriculture-based biofuel production processes, biomass-derived processes such as cellulosic ethanol and even for direct conversion.

While there are several separation technologies including distillation and pervaporation capable of removing volatile products from fermentation broths, there is a need in the industry for recovering products in dilute concentrations. Pervaporation has been explored in recent years by the EPA: Vane, L. M. A review of pervaporation for product recovery from biomass fermentation processes. *J Chem Technol Biotechnol* 2005; 80: 603-629; Vane, L. M., et al., Separation of vapor-phase alcohol/water mixtures via fractional condensation using a pilot-scale fractional condenser: enhancement of the pervaporation process separation factor, *Ind. Eng. Chem. Res.*, 43, (2004), 173; Vane, L. M. Separation technologies for the recovery and dehydration of alcohols from fermentation broths, *Biofuels, Bioprod. Bioref.* 2:553-588 (2008) for possible commercialization in ethanol recovery. However, to date, recovery of volatile products produced in low concentration in air and water mixtures remains challenging.

There is a need for apparatuses, systems and methods that can recover volatile products produced in low concentration in air and water mixtures with high purity and recovery yield. There is further a need that these apparatuses, systems and methods are designed to achieve low-cost and efficient recovery processes.

SUMMARY OF THE INVENTION

One embodiment of the present invention is a process for recovering a volatile organic compound from a feed mixture. The method includes (a) introducing the feed mixture into a fractional condensation apparatus; (b) fractionally condensing the feed mixture in a fractional condensation apparatus to form a first condensed fluid and a first vapor, the feed mixture having a temperature between about 30° C. and about 60° C. before fractional condensing; (c) condensing the first vapor in a top condenser to form a second condensed fluid and a second vapor, the top condenser having a temperature between about 6° C. and about 11° C.; and (d) condensing the second vapor in a product condenser to form a cold product stream, the product condenser having a temperature that is below the temperature of the top condenser. The feed mixture contains between about 1 mol % and about 5 mol % of the volatile organic compound, at least about 5 mol % water, and at least about 90 mol % gases selected independently from the group consisting of $N_2$, $O_2$ and $CO_2$, and mixtures thereof; whereby a concentration of the volatile organic compound in the cold product stream of at least about 80 wt % and a recovery of at least about 60 wt % is obtained.

Another embodiment of the present invention is a fractional condensation apparatus for recovering a compound from a feed mixture. The apparatus includes (a) an enclosure providing a fractional condensation volume for the mixture, the enclosure having an internal surface in contact with the fractional condensation volume, wherein the temperature of the internal surface is controllable, (b) a second surface positioned centrally within the fractional condensation volume, wherein the temperature of the second surface is controllable, and (c) first packing material between the internal surface and the second surface.

Another embodiment is a multi-sectional modular distillation system for recovering a compound from a feed mixture having a plurality of above described fractional condensation apparatuses connected to allow flow of the feed mixture through the apparatuses.

Another embodiment is a fractional condensation column for recovering a compound from a feed mixture. The fractional condensation column includes (a) a column jacket, (b) a fluid tube positioned centrally within the column and along the length of the column, and (c) first packing material between the column jacket and the fluid tube.

Another embodiment is a multi-sectional modular distillation system for recovering a compound from a feed mixture having a plurality of the above described fractional condensation columns connected to allow flow of the feed mixture through the apparatuses.

Another embodiment is a method for recovering a compound from a feed mixture. The method includes (a) flowing the feed mixture through a bottom inlet of the above described fractional condensation apparatus into the fractional condensation volume, and (b) controlling, independently, temperature profile of the internal surface and the second surface to provide an internal temperature profile within the fractional condensation volume extending from the bottom inlet to a top outlet of the apparatus, which is effective to recover the compound from the feed mixture at the top outlet with improved purity, and (c) collecting the compound at the top outlet.

Another embodiment is a further method for recovering a compound from a feed mixture. The method includes (a) flowing the feed mixture through a bottom inlet of the above described multi-sectional modular distillation system into a fractional condensation volume of a first fractional condensation apparatus, (b) controlling, independently, temperature profiles of the internal surfaces and the second surfaces of one or more of the fractional condensation apparatuses of the multi-sectional modular distillation system to provide an internal temperature profile within the fractional condensation volumes within the plurality of apparatuses, extending from the bottom inlet of the first fractional condensation apparatus to a top outlet of a last fractional condensation apparatus, which is effective to recover the compound from the feed mixture at the top outlet with improved purity, and (c) collecting the compound at the top outlet.

Another embodiment is a further method for recovering a compound from a feed mixture. The method includes (a) flowing the feed mixture through a bottom inlet of an above described fractional condensation column into a fractional condensation volume provided between the column jacket and the fluid tube, (b) controlling, independently, temperature profile of the column jacket and the fluid tube to provide an internal temperature profile within the fractional condensation volume extending from the bottom inlet to a top outlet of the column, which is effective to recover the compound from the feed mixture at the top outlet with improved purity, and (c) collecting the compound at the top outlet.

Another embodiment is a further method for recovering a compound from a feed mixture. The method includes (a) flowing the feed mixture through a bottom inlet of an above described multi-sectional modular distillation system into a fractional condensation (FC) volume of a first fractional condensation column (note, embodiments referring herein to FC columns also can use FC modules or a series of FC modules in place of a column), (b) controlling, independently, temperature profiles of the column jackets and the fluid tubes of one or more of the fractional condensation columns of the multi-sectional modular distillation system to provide an internal temperature profile within the fractional condensation volumes within the plurality of columns, extending from the bottom inlet of the first fractional condensation column to a top outlet of a last fractional condensation column, which is effective to recover the compound from the feed mixture at the top outlet with improved purity, and (c) collecting the compound at the top outlet.

A further embodiment of the present invention is a method for recovering volatile products comprising: a) introducing a feed mixture that contains at least one or more volatile products at a concentration between 1.5 wt % and 5 wt % into a fractional condenser; b) separating the volatile products under optimized operating conditions; and c) withdrawing the products at a concentration of at least about 90.4% recovery yield and about 90 wt % concentration.

A further embodiment of the present invention is a method for producing carbon-based products of interest. The method comprises: a) culturing microorganisms in a photobioreactor under suitable conditions using light, $CO_2$ and water to produce carbon-based products of interest; b) recovering the products from the photobioreactor by: i. introducing a feed mixture comprising the products of at least 1.5 wt % into a fractional condenser; ii. separating the volatile products at optimal optimized operating conditions; and iii. withdrawing the product at a concentration of at least about 90.4% recovery yield and about 90 wt % concentration.

A further embodiment of the present invention is an apparatus for recovering volatile products. The apparatus comprises: a means for introducing a feed mixture comprising one or more volatile products of at least 1.5 wt % into a fractional condenser; a means for separating the volatile products at optimal optimized operating conditions; and a means for withdrawing the product at a concentration of at least about 90.4% recovery yield and about 90 wt % concentration.

A further embodiment of the present invention is a solar biofactory system comprising (i) a photobioreactor apparatus; (ii) organisms adapted to convert light, water and carbon dioxide into carbon-based products of interest; (iii) optimized media; and (iv) apparatus for recovering the products comprising: a means for introducing a feed mixture comprising one or more volatile products of at least 1.5 wt % into a fractional condenser; a means for separating the volatile products at optimized operating conditions; and a means for withdrawing the product at a concentration of at least about 90.4% recovery yield and about 90 wt % concentration; wherein the organisms are cultured in the optimized media under suitable conditions in the photobiorector to produce the products and the products are recovered using the apparatus for recovering products as described herein.

A further embodiment of the present invention is a reactive distillation apparatus. The apparatus comprises (a) an enclosure providing a fractional condensation volume and a reactive zone, the enclosure having an internal surface in contact with the fractional condensation volume, wherein the temperature of the internal surface is controllable, and the enclosure having an inlet adapted for receiving a feed mixture and an outlet for providing a recovered product; (b) a second surface positioned centrally within the fractional condensation volume, wherein the temperature of the second surface is controllable; and (c) first packing material between the internal surface and the second surface.

A further embodiment of the present invention is a multi-sectional modular reactive distillation system comprising a plurality of reactive distillation apparatuses, wherein each apparatus is modular, and the apparatuses are connected in series to form a fractional condensation volume extending substantially throughout the connected apparatuses, the fractional condensation volume containing a reaction zone.

A further embodiment of the present invention is a reactive distillation apparatus. The apparatus includes (a) a fractional condensation column providing a fractional condensation volume, comprising (i) a column jacket; (ii) a fluid tube positioned centrally within the column and along the length of the column; and (ii) first packing material between the column jacket and the fluid tube; and (b) a reactive zone.

The present invention provides apparatuses, systems and methods that can recover volatile products produced in low concentration in air and water mixtures with high purity and recovery yield. The present apparatuses, system and methods are also designed to achieve low-cost and efficient recovery processes.

Figure 1:
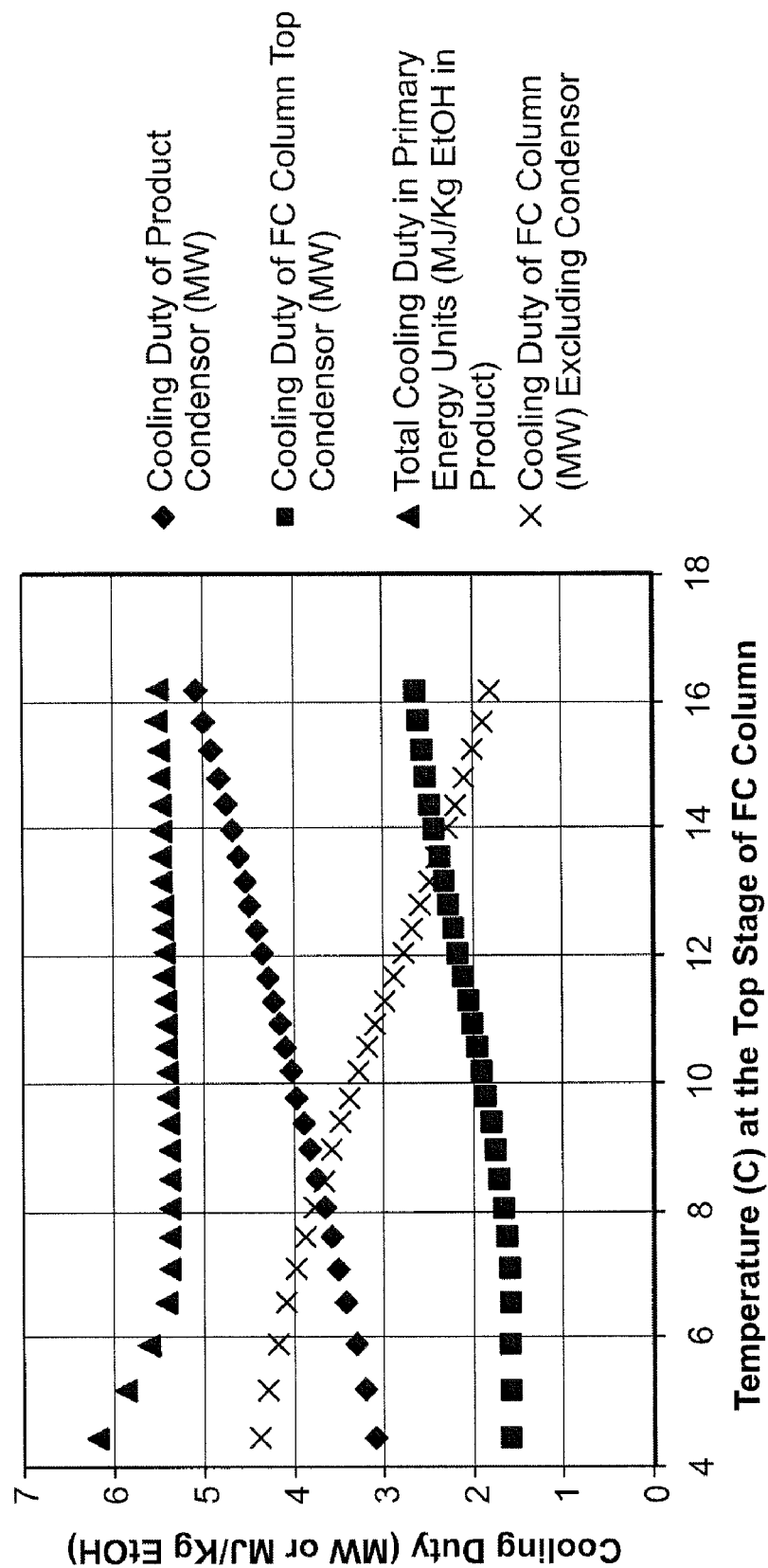
FIG. 1 is a graphical representation of various cooling duties versus the fractional condensation (FC) column top temperature for a feed mixture (vapor feed with 2 mol % Ethanol, 6.4 mol % water, 71.6 mol % $N_2$, 19 mol % $O_2$ and 1 mol % $CO_2$) at a temperature of about 38° C.

The drawings are not necessarily to scale, emphasis instead being placed upon illustrating embodiments of the present invention.

DETAILED DESCRIPTION OF THE INVENTION

A description of preferred embodiments of the invention follows. While this invention has been particularly shown and described with references to preferred embodiments thereof, it will be understood by those skilled in the art that various changes in form and details can be made therein without departing from the scope of the invention encompassed by the appended claims.

The following explanations of terms and methods are provided to better describe the present invention and to guide those of ordinary skill in the art in the practice of the present invention. As used herein, "comprising" means "including" and the singular forms "a" or "an" or "the" include plural references unless the context clearly dictates otherwise. For example, reference to "comprising a phototrophic microorganism" includes one or a plurality of such phototrophic microorganisms. The term "or" refers to a single element of stated alternative elements or a combination of two or more elements, unless the context clearly indicates otherwise.

Unless explained otherwise, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. The materials, methods, and examples are illustrative only and not intended to be limiting. Other features of the invention are apparent from the following detailed description and the claims.

The fractional condensation apparatuses, columns and systems of the present invention can efficiently separate mixtures with different feed state (either vapor feeding or liquid feeding) to a high purity (i.e., over 80%, e.g. with one column module) for both batch and continuous distillation purposes, even when the feedstock (feed mixture) is a vapor mixture present in very dilute concentration and light gases such as nitrogen, oxygen or carbon dioxide are present. Such apparatuses, columns and systems can be used for process development at laboratory and pre-pilot scale, and for plant scale separation, for example, of ethanol from photobioreactor vent streams.

The fractional condensation apparatuses, for example, the multi-purpose modular, scalable fractional condensation columns can be used to separate mixtures with either liquid or vapor feed stocks (especially for vapor feedstock separation) and for both batch and continuous distillation. The fractional condensation apparatuses and columns (also referred to as "modules") can be connected to each other to form a multi-sectional modular distillation system thereby expanding the column length. Very good thermal control can be achieved over the expanded column length, because each module can have its own cooler or heater (e.g. a column jacket and fluid tube).

Individual fractional condensation apparatuses and columns (hereinafter referred to as "apparatuses"), and particularly, multi-sectional modular distillation systems (hereinafter referred to as "systems") can be applied to separate mixtures with both narrow and wide boiling point ranges, for example, systems including one or more of alcohols, hydrocarbons, biodiesels and volatile chemicals.

The apparatuses and systems of the present invention are directed to recovering one or more compounds from a feed mixture. Typically, these are volatile organic compounds such as ethanol. The process of recovering the compound(s) leads to an increase in the concentration (e.g., by mol percentage (mol %) or weight percentage (wt %)) of the compound in the product composition or product stream compared to concentration in the feed mixture.

A "feed mixture" as used herein refers to the input stream or feed that includes the compound or compounds to be recovered. The feed mixture can be a liquid feed or a vapor feed.

The FC apparatuses and FC systems, and methods of using same of the present invention can recover the compound(s) from a feed mixture in which the compound is contained at very low initial concentration (i.e., the concentration of the compound in the feed mixture that is introduced into the apparatus or system). Such dilute feed mixtures can be produced, for example, by photobioreactors, which can produce, for example, biofuels such as ethanol as the compound to be recovered from a feed mixture that typically also contains light gases such as $N_2$, $O_2$, $CO_2$ and $CO_2$, and mixtures thereof. Photobioreactors can also produce liquid feed mixtures, for example, feed mixtures that contain biodiesel(s) with other organic compounds that are typically in close boiling point range.

Recovery of volatile organic compounds from feed mixtures that contain the volatile organic compound in dilute concentration can require substantial energy. This is of particular concern for the recovery of fuels such as biofuels, and, particularly, ethanol.

The apparatuses, systems and methods of the present invention provide ethanol recovery processes that have been found, experimentally and/or with modeling, to be able to achieve high purity, high recovery yield, high productivity and substantially reduced energy costs thereby lowering capital and operational cost.

The apparatuses, systems and methods of the present invention can be used in combination with different photobioreactor types employing different microorganisms such as mesophiles and thermophiles, requiring different operating conditions and leading typically to dilute vapor concentration of the product compound(s) in the resulting feed mixture.

The apparatuses, systems and methods of the present invention are particularly advantageous for product recovery from dilute feed mixtures, in particular, low concentration vapor feeds (compound to be recovered at below 10 mol %) which are very challenging to separate, especially, if light gases such as $N_2$ and $O_2$ are present at high concentration in the vapor feed.

It has been found that packing material in the fractional distillation (or condensation) volume and between an internal, temperature controllable surface and an outer, enclosing, temperature controllable surface (second surface) allows to significantly improve the temperature profile, both across and along the apparatus (e.g., fractional condensation column) while significantly improving mass transfer characteristics of the apparatus (e.g., fractional condensation column).

In a first specific embodiment, the apparatus and systems, and methods of the present invention are adapted to recover a compound that has an initial concentration (i.e., the concentration upon entry into the FC apparatus, e.g., column) in the vapor feed of between 1 mol % and 10% mol %, and the apparatus is adapted in the presence of a suitable temperature conditions to recover the compound with a purity of at least about 40% and a recovery yield of at least about 20%, at least about 30%, at least about 40%, at least about 50%, at least about 60%, at least 70%, at least about 80%, at least about 90%, or at least about 96%. Typically, the initial concentration is between about 1.5 mol % and about 10 mol %. More typically, the initial concentration is between about 1.5 mol % and about 5 mol %. Even more typically, the initial concentration is between about 1.5 mol % and about 3 mol %. Yet even more typically, the initial concentration is between about 2 mol % and about 3 mol %, or, alternatively, the initial concentration is about 2 mol %.

In a second specific embodiment, the apparatus and systems, and methods of the present invention are adapted to recover a compound that has an initial concentration (i.e., the concentration upon entry into the FC apparatus, e.g., column) in the liquid feed of between 1 mol % and 10% mol %, and the apparatus is adapted in the presence of a suitable temperature conditions to recover the compound with a purity of at least about 40% and a recovery yield of at least about 20%, at least about 30%, at least about 40%, at least about 50%, at least about 60%, at least 70%, at least about 80%, at least about 90%, or at least about 96%. Typically, the initial concentration is between about 1.5 mol % and about 10 mol %. More typically, the initial concentration is between about 1.5 mol % and about 5 mol %. Even more typically, the initial concentration is between about 1.5 mol % and about 3 mol %. Yet even more typically, the initial concentration is between about 2 mol % and about 3 mol %, or, alternatively, the initial concentration is about 2 mol %.

In a first specific embodiment, the apparatus and systems, and methods of the present invention are adapted to recover a compound that has an initial concentration (i.e., the concentration upon entry into the FC apparatus, e.g., column) in the vapor feed of between 1 mol % and 10 mol %, and the apparatus is adapted in the presence of a suitable temperature conditions to recover the compound with a purity of at least about 40% and a recovery yield of at least about 20%, at least about 30%, at least about 40%, at least about 50%, at least about 60%, at least 70%, at least about 80%, at least about 90%, or at least about 96% within 8 hours. Typically, the initial concentration is between about 1.5 mol % and about 10 mol %. More typically, the initial concentration is between about 1.5 mol % and about 5 mol %. Even more typically, the initial concentration is between about 1.5 mol % and about 3 mol %. Yet even more typically, the initial concentration is between about 2 mol % and about 3 mol %, or, alternatively, the initial concentration is about 2 mol %.

In a second specific embodiment, the apparatus and systems, and methods of the present invention are adapted to recover a compound that has an initial concentration (i.e., the concentration upon entry into the FC apparatus, e.g., column) in the liquid feed of between 1 mol % and 10 mol %, and the apparatus is adapted in the presence of a suitable temperature conditions to recover the compound with a purity of at least about 40% and a recovery yield of at least about 20%, at least about 30%, at least about 40%, at least about 50%, at least about 60%, at least 70%, at least about 80%, at least about 90%, or at least about 96% within 8 hours. Typically, the initial concentration is between about 1.5 mol % and about 10 mol %. More typically, the initial concentration is between about 1.5 mol % and about 5 mol %. Even more typically, the initial concentration is between about 1.5 mol % and about 3 mol %. Yet even more typically, the initial concentration is between about 2 mol % and about 3 mol %, or, alternatively, the initial concentration is about 2 mol %.

Generally, for batch operations, with longer running times recovery yields can be increased to the maximum recovery yield characteristic for the operating apparatus or system.

For vapor feeding, establishing suitable temperature conditions generally requires cooling of (i.e. providing cooling duty to) the fractional condensation volume, for example, with the internal surface (e.g., provided by a column jacket surface) and the second surface (e.g. provided by a centrally positioned fluid tube). Separate control of the temperature profile of the internal surface (e.g., by flowing water at a first specified temperature through a column jacket) and the second surface (e.g., by flowing water at a second specified temperature through a fluid tube) in the presence of packing material (e.g. glass beads of suitable dimensions) that transfers heat from the internal surface and second surface throughout the fractional condensation volume allows to control the temperature profile within the fractional condensation volume. Alternatively, or additionally, stages of, for example, a fractional condensation column can be cooled or heated with separate cooling or heating streams.

Typically, the column jacket can be packed partially or completely. In preferred embodiments, the column jacket volume is packed completely with packing material in the fractional condensation volume.

As used herein "packing material" refers to objects made of solid materials, for example, beads or rings made of glass, quartz, metal, and/or polymers, that can be filled into the fractional distillation volume, are inert under the fractional condensation conditions, and have sizes significantly smaller than the distance between the internal surface and the second surface.

As known in the art, specific suitable temperature conditions can be modeled using modeling systems such as Aspen Plus V7.0.

As used herein "recovery yield" refers the amount of ethanol collected at the bottom of product condenser divided by the amount of ethanol entering the column.

As used herein "purity" refers to the concentration of the volatile organic compound that is recovered in the condensed product stream or combination of condensed product streams.

In certain embodiments, use of photobioreactors for direct conversion to product generates a gaseous product mixture of ethanol, water, $O_2$, $N_2$, and $CO_2$, and some minor species. The ethanol product in the mixture is generally in low concentrations. In certain embodiments, the feed stream can contain about 2 mol % ethanol. Air is typically predominant in the mixture accounting for about 90-92 mol %. Since ethanol represents only a small fraction of the feed stream, it is particularly important to cut down the energy consumptions related to product recovery to make direct conversion technology cost-competitive.

Although not required, typically heat integration is preferred because it can further reduce energy costs, for example, it has been found that cooling cost can be reduced by 1.03 MJ (Primary Energy Unit=PEU)/KgEtOH for a thermophilic strain plant and 1.36 MJ (PEU)/KgEtOH for a mesophilic process. Further, application of solar heating to the lower portion of the FC column for a thermophilic process can further improve energy efficiency and thus reduce cost while increasing ethanol production purity.

PEU generally refers to the amount of primary fuel (e.g. natural gas, coal or oil) required to provide useful work for a process under consideration. As an example, 0.75 MW of primary fuel has to be consumed to produce the required amount of electricity of 0.25 MW to deliver work for a chiller rated at 1 MW for cooling. PEU serves the particularly useful purpose of providing a common basis to assess the energetic cost of processes that require different levels of work of different quality energy (e.g. 1 MW of refrigeration at −35° C. requires more PEU than 1 MW of cooling capacity at 100° C. rejecting heat to ambient air using an air cooler).

With regard to the calculation of energy values in Primary Energy Units (herein referred to with PEU): For cooling below 35° C., 0.75 MJ Primary Energy per MJ chiller duty is used. That a COP (coefficient of performance) of 4:1 for refrigeration cycle is used (i.e., 0.25 MW electricity for 1 MW cooling (with 80% compression efficiency)). In addition, a typical steam cycle power plant gives 33% efficiency, so this translates to 0.75 MW Primary Energy Units to deliver 1 MW of refrigeration. For cooling between 60° C. and 35° C., 0.06 MJ Primary Energy per MJ cooling duty is used, this is for cooling tower fans and pumps expressed into primary energy units Preferably, the methods of the present invention provide withdrawing the product at a concentration of about 90.4 wt % (relative to water) for mesophiles, about 93.8 wt % (relative to water) for thermophiles. In more preferred embodiments, the method provides withdrawing the product at a concentration of about 96.7% recovery for mesophiles, about 96.9% recovery for thermophiles.

In various other embodiments, the method provides PEU cooling of about 4.05 MJ/Kg product for mesophiles.

In alternative embodiments, the method provides PEU cooling of about 5.92 MJ/Kg product for thermophiles and/or PEU heating about 1.12 MJ/Kg product for thermophiles.

Various aspects of the invention also provide reducing energy consumption to at least about 1.00 MJ/Kg product by energy integration. Accordingly, the method provides recovering volatile products at a savings of PEU about 1.36 MJ/Kg product for mesophiles and/or about 1.05 MJ/Kg product for thermophiles.

Suitable conditions for product separation include a feed mixture temperature of between 30° C. to 60° C. Preferably, the feed mixture is introduced at a temperature of about 38° C., provided, for example from a photobioreactor or photobioreactor array cultivating mesophiles to produce the volatile organic compound such as ethanol, or about 55° C., provided, for example from a photobioreactor or photobioreactor array cultivating thermophiles to produce the volatile organic compound such as ethanol.

Other conditions include operating the top of the fractional condenser at a temperature of about 6° C. to about 11° C., and about 6.4° C. to about 7.9° C. for mesophiles (i.e., for feed mixtures obtained from a photobioreactor cultivating mesophiles to produce the volatile organic compound). More preferably, the top of the fractional condenser can be controlled to have a temperature of about 7.4° C. for mesophiles. For thermophiles, the top of the fractional condenser preferably is controlled to have a temperature of about 9° C.

A significant advantage of the methods of the present invention is that they can substantially reduce water loss thereby maintaining the water level during operation by recirculation of the water that has been separated from the volatile organic product for renewed use, for example, in the photobioreactor(s).

In certain embodiments, the feed mixture comprises a volatile organic product (e.g. one or more compounds produced by mesophiles or thermophiles cultivated in a photobioreactor), water and gas, typically, containing $N_2$, $O_2$, and/or $CO_2$. Preferably, the volatile organic product in a feed mixture is an alcohol such as ethanol. The volatile organic product can be present in the feed mixture at any concentration, however, higher concentrations are typically desired, and feed mixtures provided by microorganisms cultivated in photobioreactors typically produce feed mixtures in which the volatile organic compound is present in low concentration, for example, the volatile organic compound (e.g. an alcohol such as ethanol) can be present at a concentration between 1 wt % and 10 wt %, 1 wt % and 5 wt %, 1 wt % and 3 wt %, 1.5 wt % and 3 wt %, 1.5 wt % and 2.5 wt %, or at about 2 wt %. Vapor feed mixtures containing ethanol as the volatile organic compound to be recovered, typically, contain between about 2 mol % and 3 mol % ethanol. Liquid feed mixtures containing ethanol as the volatile organic compound to be recovered, typically, contain between about 1.5 wt % and about 5 wt % ethanol.

"Solar heating" as referred to herein refers to the reduction, complete or in part, of cooling duty applied to the bottom section of the fractional condensation apparatuses (e.g., column, modular column, etc.). Solar heating has been found to be generally advantageous for warmer feed streams, for example, feed mixtures provided by photobioreactor(s) cultivating thermophiles.

In the methods and systems of the present invention, a stripper can be used for the FC column bottom stream to reduce ethanol recycle operation cost and increase product recovery yield.

The term "direct conversion" applies to the process whereby a host cell takes in light, $CO_2$ and water as input and produces a carbon-based product of interest. Such organisms may be genetically engineered, selected or be a wild-type.

A "biofuel" as used herein refers to liquid and gaseous fuels derived from biological sources. Examples of biofuels include but are not limited to hydrocarbons, alcohols such as ethanol, fatty esters, biodiesel, and mixtures thereof.

"Carbon-based products of interest" include alcohols such as ethanol, propanol, isopropanol, butanol and fatty alcohols.

Autotrophs (or autotrophic organisms) are organisms that produce complex organic compounds from simple inorganic molecules and an external source of energy, such as light (photoautotroph) or chemical reactions of inorganic compounds.

Phototrophs (photoautotrophs) are organisms that carry out photosynthesis such as, eukaryotic plants, algae, protists and prokaryotic cyanobacteria, green-sulfur bacteria, green non-sulfur bacteria, purple sulfur bacteria, and purple non-sulfur bacteria. Phototrophs also include engineered organisms to carry out photosynthesis and hyperlight capturing organisms.

Heterotrophs (or heterotrophic organisms) are organisms that, unlike autotrophs, cannot derive energy directly from light or from inorganic chemicals, and so must feed on organic carbon substrates. They obtain chemical energy by breaking down the organic molecules they consume. Heterotrophs include animals, fungi, and numerous types of bacteria.

Light capturing organism: Light capturing organisms (or light capturing organisms) are organisms that use light alone or in combination with other energy sources, to drive the activities of a cell. This includes photoautotrophs, phototrophs, heterotrophs engineered to have the ability to use light to power some or all of their activities, and engineered phototrophs/photoautotrophs.

A photobioreactor apparatus, bioreactor or reactor is used interchangeably to describe an apparatus, device or system that supports a biologically active environment. For instance, a bioreactor can be a vessel wherein a chemical process involving photosynthesis in organisms is carried out or biochemically active substances are derived from such organisms. Such photobioreactors can support activities for either aerobic or anaerobic organisms. Organisms growing in photobioreactors may be suspended or immobilized. The products of interest can be secreted.

Benchmarking EPA Research Work on Fractional Condensation

Vane et al (2004) at EPA, among others, have done some study on using Fractional Condensation technology in recovering ethanol. They claimed multi-fold increase in separation factor (or relative volatility ratio). Vane and team have performed small pilot unit runs with a 4~6 theoretical stage column (width*depth*height=0.2 m*0.22 m*2.4 m). Their facility was able to concentrate 34.5 wt % ethanol (vapor feed, 100 Kg/h at 60° C. under 300 Torr) to 85.4 wt % with 90% recovery. Their heat removed per stage was about 11 KW, or 43.6 KW total heat removal.

Simulation runs were performed to benchmark the work at EPA (Vane et al, 2004) for fractional condensation with vapor phase ethanol feed. The simulation results matched well with EPA publication. This indicates that the flowsheet model, the physical property model and the model parameters used are adequate. For example, at the total cooling rate 56 MW (primary energy unit, PEU 4.95 MJ/Kg EtOH for ethanol production rate of 40729 Kg/h), the ethanol purity in the product is 84.9 wt % and the recovery yield is of 90.7%. The PEU cooling duty is close to the EPA published value of 5.18 MJ/Kg EtOH.

Whereas Vane et al. achieves separation from vapor feed with an ethanol concentration of 34.5 wt %, the methods, apparatuses and systems of the present invention allow recovery of ethanol from feed mixture having substantially lower ethanol concentration (e.g. 2 mol %) in the feed mixture (stream) with improved product purity and recovery.

The present invention provides methods, systems and apparatuses that overcome the deficiencies of the prior art and allow cost and energy efficient recovery of volatile organic compound(s), for example, ethanol from feed streams (mixtures) having low and even very low concentration of the volatile organic compound(s), with high purity and high recovery.

The low ethanol concentration in the non-condensible gas at elevated temperature surprisingly results in higher purity. Without wishing to be bound it is believed that low partial pressure and sensible heat available from the non-condensible gas generates a driving force for internal reflux and high separation efficiency. Particularly in the case where the heat is derived from solar energy and more particularly when maximizing this available heat by operating a thermophile in the PBR, this maximizes separation efficiency while minimizing exogenous PEU inputs.

Thermophilic Fractional Condensation Process for Ethanol Recovery

It has been found that the thermophilic fractional condensation process for ethanol recovery with solar heating section in the FC column and a stripper for FC bottom ethanol recycle can achieve the following: A feed with 2 mol % EtOH at 55° C. from a photobioreactor is fed into the column that has 10 coolers and 17 stages. The product stream has 10696 KgEtOH/h (28.7 MGY, million gallons per year) flow rate at 93.8 wt % (relative EtOH concentration), 92.8 wt % (absolute). Heat integration can help save about 3.08 MW (primary energy basis) of cooling, which is equivalent to 1.03 MJ (PEU)/KgEtOH. The duty after heat integration is PEU: Cooling=−5.92 MJ/kgEtOH, Heating=1.12 MJ/KgEtOH (for stripper). The FC column top temperature is at Ttop=8.92 C, and the bottom is at Tbot=55.6 C. The product condenser temperature is −35° C. Ethanol recovery is 96.9%.

Mesophilic Fractional Condensation Process for Ethanol Recovery

It has been found that the mesophilic fractional condensation process for ethanol recovery can achieve the following: For this case, the Primary Energy Unit (PEU) based cooling duty is 5.408 MJ/Kg EtOH at 90.4 wt % (relative to water), or 88.4 wt % (absolute). The production capacity of this simulation plant is 4564 Kg/h EtOH at the above concentration, which is equivalent to 12.23 MGY. Heat integration provides about 2.3 MW of cooling, which is about PEU 1.36 MJ/Kg EtOH, so the energy integrated ethanol recovery process for mesophilic production consumes 5.41−1.36=4.05 MJ/Kg EtOH. The product condenser temperature is −35° C. Ethanol recovery yield is 96.7%.

The following examples are for illustrative purposes and are not intended to limit the scope of the invention. Aspen Plus V7.0 has been used as process modeling software.

Example 1

Ethanol Recovery Using Fractional Condensation of a Feed Mixture Obtained in a Mesophilic Process FIG. 1 provides a graph of the cooling duty versus condenser temperature at the top of the FC column for a feed mixture obtained in a mesophilic process. The baseline conditions for FIG. 1 are: Feed: 2 mol % EtOH, for example, from a photobioreactor or solar biofactory, 38° C., 10 stage cooler column; product: 4567.5 Kg/EtOH, DutyPEU=5.3974 MJ/KgEtOH at EtOH 91.2 wt % (Rel. to water, i.e., wt % ethanol/(wt % water+wt % ethanol)), 89.5 wt % (Abs.); Tprod (i.e. temperature of the product condenser) is −35° C., Ttop (i.e. temperature of the top condenser) is 7.09° C., TBot (i.e., temperature of the feed mixture entering the fractional distillation apparatus) is 37.97° C.

It has been found that total cooling duty experiences an optimum (minimum) at Primary Energy Unit value (without energy integration) of 5.397 MJ/Kg EtOH.

Figure 2:
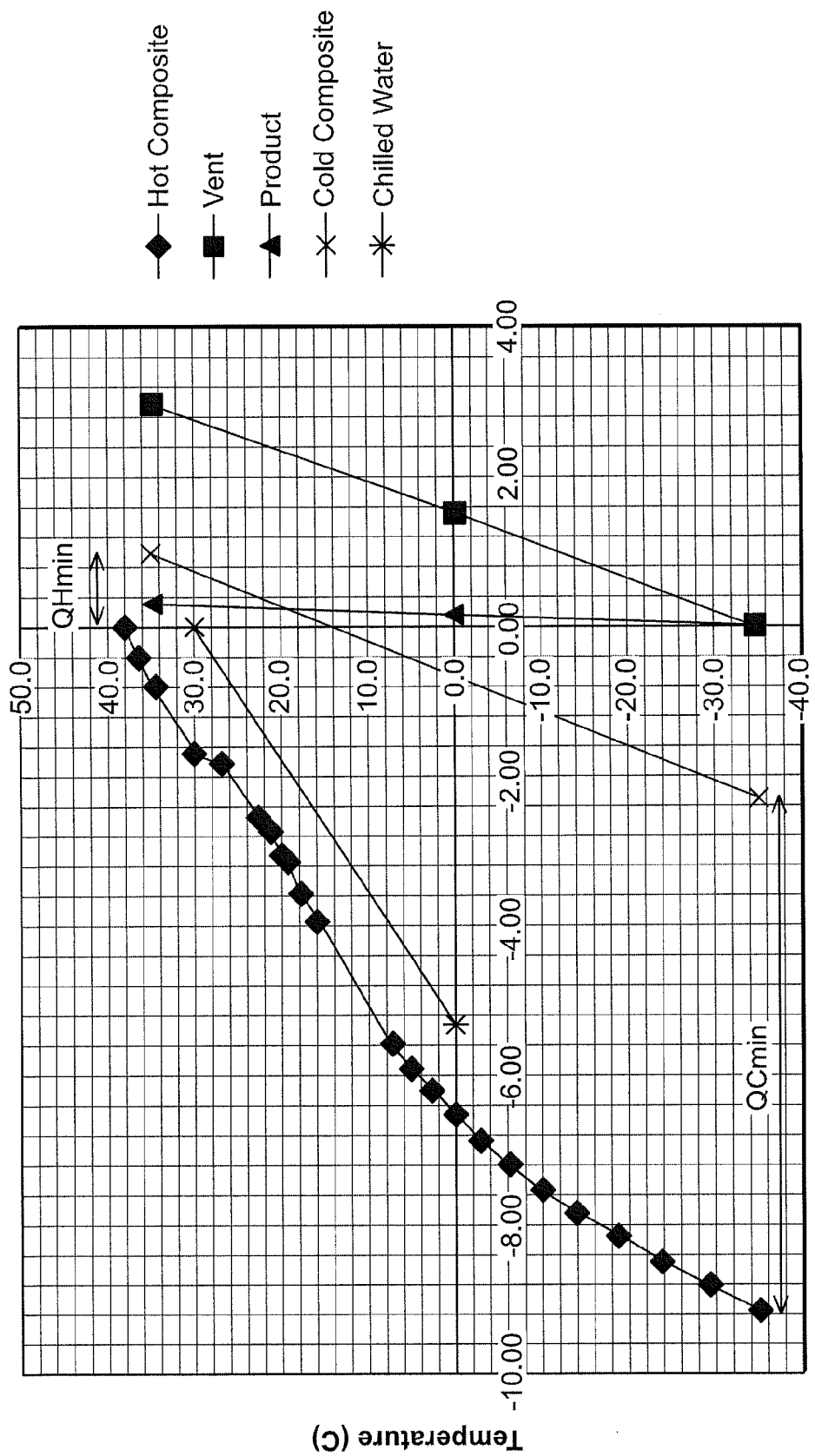
FIG. 2 is an energy integration diagram which has been obtained using Pinch analysis for the case represented in FIG. 1.

FIG. 2 is the corresponding energy integration diagram which has been obtained using Pinch analysis. The top diamond curve is the hot composite curve of all the unit operations and streams that need cooling, and the cold composite line consists of the cold product stream (triangle) and the cold vent stream (square) both at −35° C. available for heating up. The second line from the left (asterisk) represents the intermediate cooling media (e.g., water or glycol) that is used to avoid air-to-air heat transfer between the cold and hot streams. Conditions for FIG. 2: Feed: 2 mol % EtOH, for example, from a photobioreactor or solar biofactory, 38° C., 10 stage cooler column; Product: 4564.2 Kg/h EtOH, DutyPEU=5.408 MJ/KgEtOH at EtOH 90.4 wt % (Rel.), 88.4 wt % (Abs.); Tprod=−35° C., Ttop=7.4° C., TBot=37.91° C. Vent-Chilled Water: $\Delta T_{1m}$=30.54 C.

Figure 4:
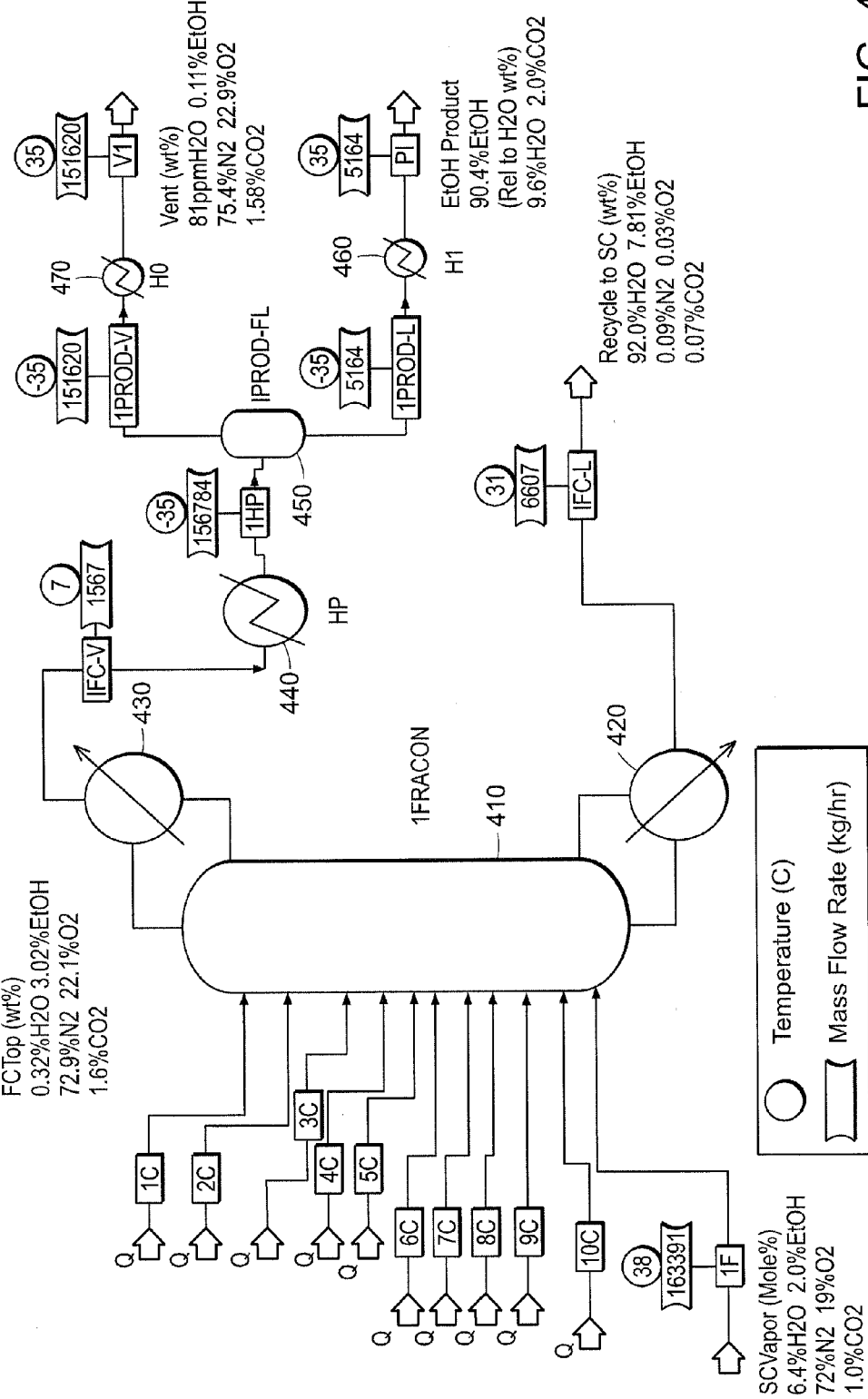
FIG. 4 provides a model flowsheet for an ethanol recovery process using fractional condensation with heat integration of a feed mixture (vapor feed with 2 mol % Ethanol, 6.4 mol % water, 71.6 mol % $N_2$, 19 mol % $O_2$ and 1 mol % $CO_2$) with initial temperature of about 38° C.

The Primary Energy Unit (PEU) based cooling duty has been found to be 5.408 MJ/Kg EtOH at 90.4 wt % (relative to water), or 88.4 wt % (absolute). The production capacity of a corresponding plant is 4564 Kg/h EtOH at the above concentration, which is equivalent to 12.23 MGY. Heat integration provides about 2.3 MW of cooling, which is about PEU 1.36 MJ/Kg EtOH, so the energy integrated ethanol recovery process for mesophilic production consumes 5.41−1.36=4.05 MJ/Kg EtOH. Ethanol recovery yield is 96.7 wt %. The below table, Table 1, lists process operation parameters for a modelling calculation of a mesophilic fuel recovery process using fractional condensation (see also FIG. 4 regarding streams 1F, 1FC-L, 1FC-V, 1PROD-V, 1PROD-L and 1PROD-V).

is the vapor feed from sol converter to the column, 1FC-V is the vapor from the top of the column (ethanol rich), 1FC-L is the liquid from the bottom of the column (water rich), 1PROD-V is the vent stream of the product condenser, 1PROD-L is the liquid product stream. In FIG. 4, the FC column (12 stages including 10 stage cooler column) and flowsheet were established for a mesophilic ethanol production process. The feed is a 38° C. vapor containing 2 mol %

| Stream | 1F | 1FC-L | 1FC-V | 1PROD-L | 1PROD-V |
|---|---|---|---|---|---|
| Temperature C. | 3.8000E+01 | 3.7906E+01 | 7.3984E+00 | −3.5000E+01 | −3.5000E+01 |
| Pressure atm | 1.0000E+00 | 1.0000E+00 | 1.0000E+00 | 1.0000E+00 | 1.0000E+00 |
| Vapor Frac | 1.0000E+00 | 0.0000E+00 | 1.0000E+00 | 0.0000E+00 | 1.0000E+00 |
| Solid Frac | 0.0000E+00 | 0.0000E+00 | 0.0000E+00 | 0.0000E+00 | 0.0000E+00 |
| Mole Flow kmol/hr | 5.7024E+03 | 3.4900E+02 | 5.3534E+03 | 1.2865E+02 | 5.2247E+03 |
| Mass Flow kg/hr | 1.6339E+05 | 6.6074E+03 | 1.5678E+05 | 5.1638E+03 | 1.5162E+05 |
| Volume Flow l/min | 2.4265E+06 | 1.1429E+02 | 2.0540E+06 | 9.8465E+01 | 1.7017E+06 |
| Enthalpy Gcal/hr | −3.2321E+01 | −2.3718E+01 | −1.3392E+01 | −8.8981E+00 | −7.5655E+00 |
| Mass Flow kg/hr | | | | | |
| H2O | 6.5747E+03 | 6.0784E+03 | 4.9634E+02 | 4.8395E+02 | 1.2387E+01 |
| ETHANOL | 5.2541E+03 | 5.1597E+02 | 4.7381E+03 | 4.5642E+03 | 1.7392E+02 |
| N2 | 1.1433E+05 | 6.0494E+00 | 1.1432E+05 | 5.4120E+00 | 1.1432E+05 |
| O2 | 3.4724E+04 | 2.1944E+00 | 3.4722E+04 | 2.3142E+00 | 3.4720E+04 |
| CO2 | 2.5096E+03 | 4.7883E+00 | 2.5048E+03 | 1.0795E+02 | 2.3969E+03 |
| Mass Frac | | | | | |
| H2O | 4.0239E−02 | 9.1994E−01 | 3.1660E−03 | 9.3720E−02 | 8.1700E−05 |
| ETHANOL | 3.2156E−02 | 7.8090E−02 | 3.0221E−02 | 8.8388E−01 | 1.1470E−03 |
| N2 | 6.9972E−01 | 9.1600E−04 | 7.2917E−01 | 1.0480E−03 | 7.5397E−01 |
| O2 | 2.1252E−01 | 3.3200E−04 | 2.2146E−01 | 4.4800E−04 | 2.2899E−01 |
| CO2 | 1.5360E−02 | 7.2500E−04 | 1.5976E−02 | 2.0906E−02 | 1.5808E−02 |
| Mole Flow kmol/hr | | | | | |
| H2O | 3.6495E+02 | 3.3740E+02 | 2.7551E+01 | 2.6864E+01 | 6.8760E−01 |
| ETHANOL | 1.1405E+02 | 1.1200E+01 | 1.0285E+02 | 9.9073E+01 | 3.7751E+00 |
| N2 | 4.0812E+03 | 2.1595E−01 | 4.0810E+03 | 1.9319E−01 | 4.0808E+03 |
| O2 | 1.0852E+03 | 6.8578E−02 | 1.0851E+03 | 7.2321E−02 | 1.0850E+03 |
| CO2 | 5.7024E+01 | 1.0880E−01 | 5.6915E+01 | 2.4529E+00 | 5.4462E+01 |
| Mole Frac | | | | | |
| H2O | 6.4000E−02 | 9.6678E−01 | 5.1460E−03 | 2.0880E−01 | 1.3200E−04 |
| ETHANOL | 2.0000E−02 | 3.2092E−02 | 1.9212E−02 | 7.7007E−01 | 7.2300E−04 |
| N2 | 7.1570E−01 | 6.1900E−04 | 7.6232E−01 | 1.5020E−03 | 7.8105E−01 |
| O2 | 1.9030E−01 | 1.9700E−04 | 2.0269E−01 | 5.6200E−04 | 2.0767E−01 |
| CO2 | 1.0000E−02 | 3.1200E−04 | 1.0632E−02 | 1.9066E−02 | 1.0424E−02 |

Figure 3:
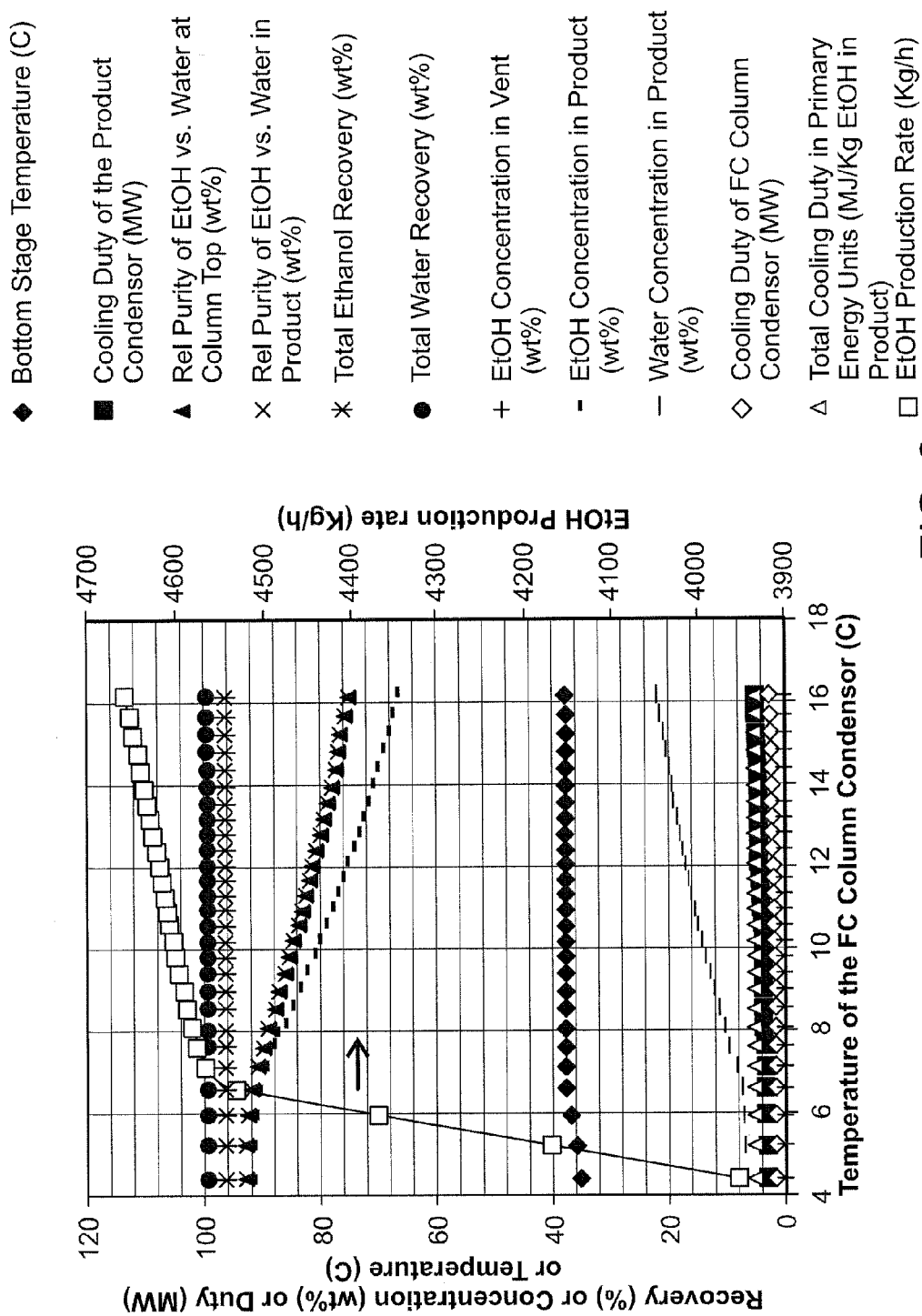
FIG. 3 is a graphical representation of various parameters including ethanol recovery versus the FC column top condenser temperature for a feed mixture (vapor feed with 2 mol % Ethanol, 6.4 mol % water, 71.6 mol % $N_2$, 19 mol % $O_2$ and 1 mol % $CO_2$) at a temperature of about 38° C.

It can be seen from FIG. 3 that there exists a tradeoff between ethanol purity, productivity yield (rate) and FC column top (condenser) temperature. The transition point is between about 6.4° C. and about 7.5° C. Below the transition point, productivity decreases significantly, while above it, purity suffers. The baseline model was run at 7.4° C. The baseline conditions for FIG. 3 are: Feed 163,391 kg/h, 38° C.; feed mixture composition in wt % (i.e., percentage by weight) 3.2 EtOH, 4.0 water, 70.0 $N_2$, 21.3 $O_2$, 1.5 $CO_2$; corresponding mole fractions (also referred to herein as "MoleFrac"): 2% EtOH, 6.4% Water, 71.6% $N_2$, 19% $O_2$, 1% $CO_2$. Productivity: 3973~4567 Kg/h EtOH in a corresponding plant.

FIG. 4 provides a model flowsheet for the ethanol recovery process using fractional condensation with heat integration of a feed mixture with initial temperature of about 38° C. 410 is the fractional condensation column, 420 is the bottom stage of the column with zero duty. 430 is the column top condenser, i.e., the top stage of the column. 440 is the product condenser, 450 is the flash drum of the product condenser, and 460 and 470 are the heat exchangers for energy integration. IF ethanol, provided, for example, from a photobioreactor, the rest is 91% air, 1% $CO_2$ and 6.4% water. The column top vapor contains 3% ethanol, with a relative ethanol concentration of 90.5% (ethanol relative to water). The vapor is at 7.4° C. and is then chilled to −35° C. to flash out air and get ethanol product at 90.4 wt % (relative to water) with a flow rate of 4564 Kg/h, and a recovery of 87% ethanol in the product. Ethanol loss to vent is 3.3%, and 9.7% ethanol from the feed is recycled back for continued recovery, so the net ethanol recovery yield is 96.7%.

Figure 5:
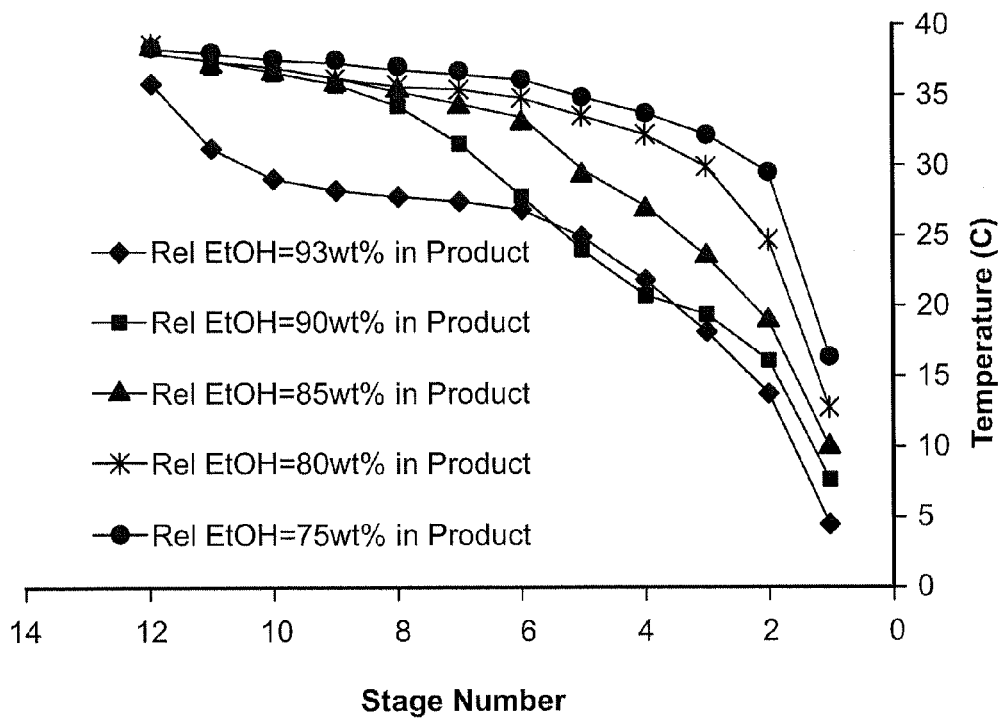
FIG. 5 provides a graphical representation of the temperature profile in the FC column.

FIG. 5 provides a graphical representation of the temperature profile in the FC column. The baseline conditions for FIG. 5 are: feed mixture containing 2 mol % EtOH from, for example, a photobioreactor or solar biofactory (including, e.g., an array of photobioreactors), temperature of the feed mixture is about 38° C.; 10 cooler column, product at −35° C.

The below table, Table 2, provides simulation output information used for analyzing the trend of concentration and flowrate profiles along the column.

|  | 1F | 1FC | 1FC-L | 1FC-V | 1PROD-L | 1PROD-V |
|---|---|---|---|---|---|---|
| Temperature C. | 3.8000E+01 | 3.8000E+01 | 3.5488E+01 | 4.4312E+00 | −3.5000E+01 | −3.5000E+01 |
| Pressure atm | 1.0000E+00 | 1.0000E+00 | 1.0000E+00 | 1.0000E+00 | 1.0000E+00 | 1.0000E+00 |
| Vapor Frac | 1.0000E+00 | 1.0000E+00 | 0.0000E+00 | 1.0000E+00 | 0.0000E+00 | 1.0000E+00 |
| Solid Frac | 0.0000E+00 | 0.0000E+00 | 0.0000E+00 | 0.0000E+00 | 0.0000E+00 | 0.0000E+00 |
| Mole Flow kmol/hr | 5.7024E+03 | 5.7024E+03 | 3.7238E+02 | 5.3300E+03 | 1.0388E+02 | 5.2261E+03 |
| Mass Flow kg/hr | 1.6339E+05 | 1.6339E+05 | 7.3863E+03 | 1.5601E+05 | 4.3218E+03 | 1.5168E+05 |
| Volume Flow l/min | 2.4265E+06 | 2.4265E+06 | 1.2945E+02 | 2.0234E+06 | 8.3229E+01 | 1.7021E+06 |
| Enthalpy Gcal/hr | −3.2321E+01 | −3.2321E+01 | −2.5305E+01 | −1.2170E+01 | −7.1412E+00 | −7.6950E+00 |
| Mass Flow kg/hr |  |  |  |  |  |  |
| H2O | 6.5747E+03 | 6.5747E+03 | 6.2695E+03 | 3.0525E+02 | 2.9428E+02 | 1.0973E+01 |
| ETHANOL | 5.2541E+03 | 5.2541E+03 | 1.1006E+03 | 4.1535E+03 | 3.9748E+03 | 1.7867E+02 |
| N2 | 1.1433E+05 | 1.1433E+05 | 6.9995E+00 | 1.1432E+05 | 4.3544E+00 | 1.1432E+05 |
| O2 | 3.4724E+04 | 3.4724E+04 | 2.5498E+00 | 3.4721E+04 | 1.8620E+00 | 3.4720E+04 |
| CO2 | 2.5096E+03 | 2.5096E+03 | 6.6110E+00 | 2.5030E+03 | 4.6476E+01 | 2.4565E+03 |
| Mass Frac |  |  |  |  |  |  |
| H2O | 4.0239E-02 | 4.0239E-02 | 8.4880E-01 | 1.9570E-03 | 6.8092E-02 | 7.2300E-05 |
| ETHANOL | 3.2156E-02 | 3.2156E-02 | 1.4901E-01 | 2.6624E-02 | 9.1972E-01 | 1.1780E-03 |
| N2 | 6.9972E-01 | 6.9972E-01 | 9.4800E-04 | 7.3281E-01 | 1.0080E-03 | 7.5366E-01 |
| O2 | 2.1252E-01 | 2.1252E-01 | 3.4500E-04 | 2.2257E-01 | 4.3100E-04 | 2.2890E-01 |
| CO2 | 1.5360E-02 | 1.5360E-02 | 8.9500E-04 | 1.6044E-02 | 1.0754E-02 | 1.6195E-02 |
| Mole Flow kmol/hr |  |  |  |  |  |  |
| H2O | 3.6495E+02 | 3.6495E+02 | 3.4801E+02 | 1.6944E+01 | 1.6335E+01 | 6.0909E-01 |
| ETHANOL | 1.1405E+02 | 1.1405E+02 | 2.3891E+01 | 9.0157E+01 | 8.6279E+01 | 3.8782E+00 |
| N2 | 4.0812E+03 | 4.0812E+03 | 2.4986E-01 | 4.0810E+03 | 1.5544E-01 | 4.0808E+03 |
| O2 | 1.0852E+03 | 1.0852E+03 | 7.9683E-02 | 1.0851E+03 | 5.8189E-02 | 1.0850E+03 |
| CO2 | 5.7024E+01 | 5.7024E+01 | 1.5022E-01 | 5.6874E+01 | 1.0560E+00 | 5.5818E+01 |
| Mole Frac |  |  |  |  |  |  |
| H2O | 6.4000E-02 | 6.4000E-02 | 9.3456E-01 | 3.1790E-03 | 1.5724E-01 | 1.1700E-04 |
| ETHANOL | 2.0000E-02 | 2.0000E-02 | 6.4157E-02 | 1.6915E-02 | 8.3054E-01 | 7.4200E-04 |
| N2 | 7.1570E-01 | 7.1570E-01 | 6.7100E-04 | 7.6566E-01 | 1.4960E-03 | 7.8085E-01 |
| O2 | 1.9030E-01 | 1.9030E-01 | 2.1400E-04 | 2.0358E-01 | 5.6000E-04 | 2.0762E-01 |
| CO2 | 1.0000E-02 | 1.0000E-02 | 4.0300E-04 | 1.0670E-02 | 1.0166E-02 | 1.0681E-02 |

Tables 3, 4 and 5 provide detailed profile data from the simulation/modeling.

TABLE 3

Stage Temperature and Flow Profile

| Stage | T C | P atm | Q kW | Liquid flow kmol/hr | Vapor flow kmol/hr | Liquid flow kg/hr | Vapor flow kg/hr | L/G mol/mol | L/G kg/kg |
|---|---|---|---|---|---|---|---|---|---|
| 1 | 4.43 | 1 | −1594.8 | 94.43 | 5330.02 | 3900.13 | 156005.028 | 0.018 | 0.025 |
| 2 | 13.71 | 1 | −1000 | 161.81 | 5424.33 | 6645.29 | 159900.154 | 0.030 | 0.042 |
| 3 | 18.10 | 1 | −1000 | 231.92 | 5491.70 | 9461.22 | 162645.319 | 0.042 | 0.058 |
| 4 | 21.69 | 1 | −1000 | 304.47 | 5561.82 | 12313.31 | 165461.247 | 0.055 | 0.074 |
| 5 | 24.75 | 1 | −800 | 364.49 | 5634.49 | 14567.82 | 168318.333 | 0.065 | 0.087 |
| 6 | 26.93 | 1 | −100 | 373.42 | 5694.51 | 14683.54 | 170572.845 | 0.066 | 0.086 |
| 7 | 27.31 | 1 | −100 | 380.37 | 5703.44 | 14632.94 | 170688.572 | 0.067 | 0.086 |
| 8 | 27.67 | 1 | −100 | 386.69 | 5710.39 | 14405.92 | 170637.969 | 0.068 | 0.084 |

TABLE 4

Vapor Phase Component MassFrac and Mass Flow Profile

| Stage | H2O | ETHANOL | N2 | O2 | CO2 | EtOH kg/h | H2O Kg/h |
|---|---|---|---|---|---|---|---|
| 1 | 0.0020 | 0.0266 | 0.7328 | 0.2226 | 0.0160 | 4153.46 | 305.25 |
| 2 | 0.0037 | 0.0485 | 0.7150 | 0.2172 | 0.0157 | 7754.80 | 592.49 |
| 3 | 0.0051 | 0.0631 | 0.7029 | 0.2135 | 0.0154 | 10268.06 | 822.14 |
| 4 | 0.0066 | 0.0775 | 0.6910 | 0.2099 | 0.0152 | 12816.12 | 1087.35 |
| 5 | 0.0083 | 0.0912 | 0.6792 | 0.2063 | 0.0149 | 15356.23 | 1401.72 |
| 6 | 0.0101 | 0.1013 | 0.6703 | 0.2036 | 0.0147 | 17281.53 | 1728.99 |
| 7 | 0.0112 | 0.1008 | 0.6698 | 0.2034 | 0.0147 | 17207.27 | 1918.95 |
| 8 | 0.0126 | 0.0991 | 0.6700 | 0.2035 | 0.0147 | 16918.02 | 2156.78 |
| 9 | 0.0146 | 0.0960 | 0.6709 | 0.2038 | 0.0147 | 16357.25 | 2489.44 |
| 10 | 0.0177 | 0.0898 | 0.6732 | 0.2045 | 0.0148 | 15245.91 | 3008.22 |

TABLE 4-continued

Vapor Phase Component MassFrac and Mass Flow Profile

| Stage | H2O | ETHANOL | N2 | O2 | CO2 | EtOH kg/h | H2O Kg/h |
|---|---|---|---|---|---|---|---|
| 11 | 0.0234 | 0.0760 | 0.6793 | 0.2063 | 0.0149 | 12794.41 | 3944.69 |
| 12 | 0.0339 | 0.0488 | 0.6920 | 0.2102 | 0.0152 | 8062.61 | 5595.37 |

TABLE 5

Liquid Phase Component MassFrac and Mass Flow Profile

| Stage | H2O | ETHANOL | N2 | O2 | CO2 | EtOH kg/h | H2O Kg/h |
|---|---|---|---|---|---|---|---|
| 1 | 0.0738 | 0.9246 | 0.0007 | 0.0003 | 0.0008 | 3605.92 | 287.65 |
| 2 | 0.0778 | 0.9208 | 0.0006 | 0.0002 | 0.0005 | 6119.18 | 517.31 |
| 3 | 0.0827 | 0.9161 | 0.0006 | 0.0002 | 0.0004 | 8667.23 | 782.51 |
| 4 | 0.0890 | 0.9098 | 0.0006 | 0.0002 | 0.0004 | 11202.77 | 1096.48 |
| 5 | 0.0977 | 0.9012 | 0.0006 | 0.0002 | 0.0003 | 13128.06 | 1423.75 |
| 6 | 0.1099 | 0.8890 | 0.0006 | 0.0002 | 0.0003 | 13053.80 | 1613.71 |
| 7 | 0.1265 | 0.8723 | 0.0006 | 0.0002 | 0.0004 | 12764.56 | 1851.54 |
| 8 | 0.1516 | 0.8471 | 0.0006 | 0.0002 | 0.0004 | 12203.79 | 2184.19 |
| 9 | 0.1957 | 0.8029 | 0.0007 | 0.0002 | 0.0005 | 11092.45 | 2702.98 |
| 10 | 0.2958 | 0.7024 | 0.0008 | 0.0003 | 0.0007 | 8640.95 | 3639.44 |
| 11 | 0.5737 | 0.4239 | 0.0010 | 0.0004 | 0.0011 | 3909.15 | 5290.12 |
| 12 | 0.8488 | 0.1490 | 0.0009 | 0.0003 | 0.0009 | 1100.62 | 6269.49 |

Figure 6:
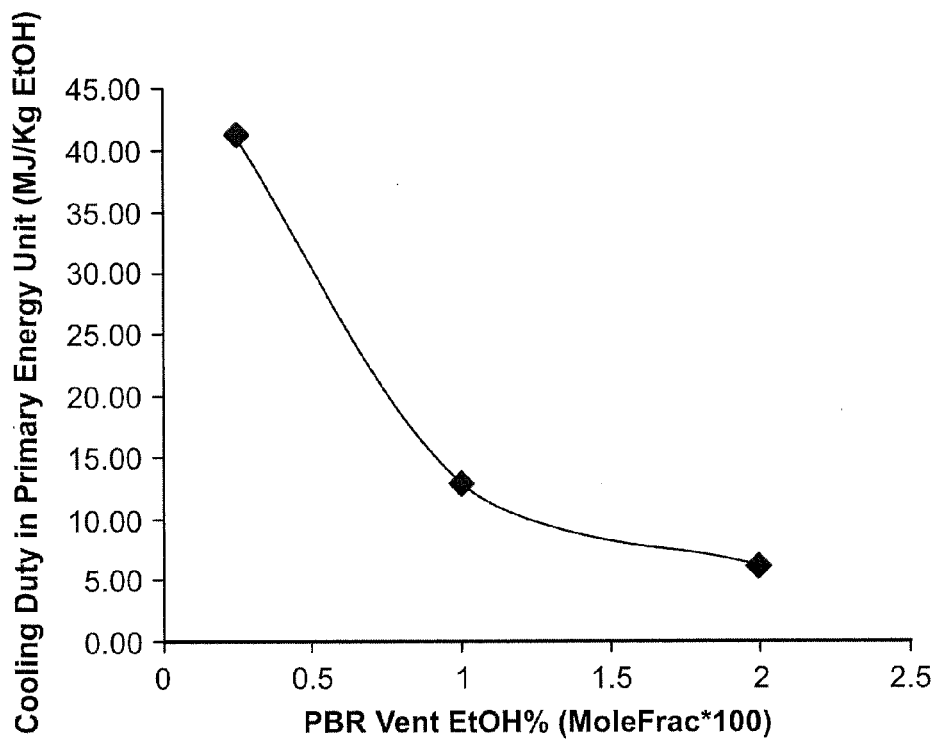
FIG. 6 provides a graphical representation of the fractional condensation cooling duty requirement as a function of the vapor stream ethanol concentration entering the FC apparatus.

FIG. 6 shows the fractional condensation cooling duty requirement in relation to the vapor stream ethanol concentration in mol %. Generally, higher concentrations are preferable. However, if the vapor stream is directly (i.e., without concentrating prior to introducing the vapor stream into the FC apparatus or system) provided by a photobioreactor or photobioreactor array, typically, the vapor stream ethanol concentration is below 10 mol %. Additionally, based on FIG. 6, typically, the vapor stream ethanol concentration is at least 1 mol %, and preferably, at least 1.5 mol %, and more preferably at least 2 mol %. Vapor stream ethanol concentrations below 1 mol % can be used, however, are expected to lead to substantially high cooling requirements.

The simulation baseline for FIG. 6 is as follows: Feed 163,391 kg/h; feed mixture/stream composition in wt %: 0.04~3.2 EtOH, 4.0 water, ~70.0 $N_2$~21.3 $O_2$, 1.5$CO_2$; corresponding mole fractions; 0.25~2% EtOH, 6.4% water, ~71.6% $N_2$, ~19% $O_2$, 1% $CO_2$. Feed mixture temperature is 38° C. and the pressure 1 atm.

Example 2

Figure 7:
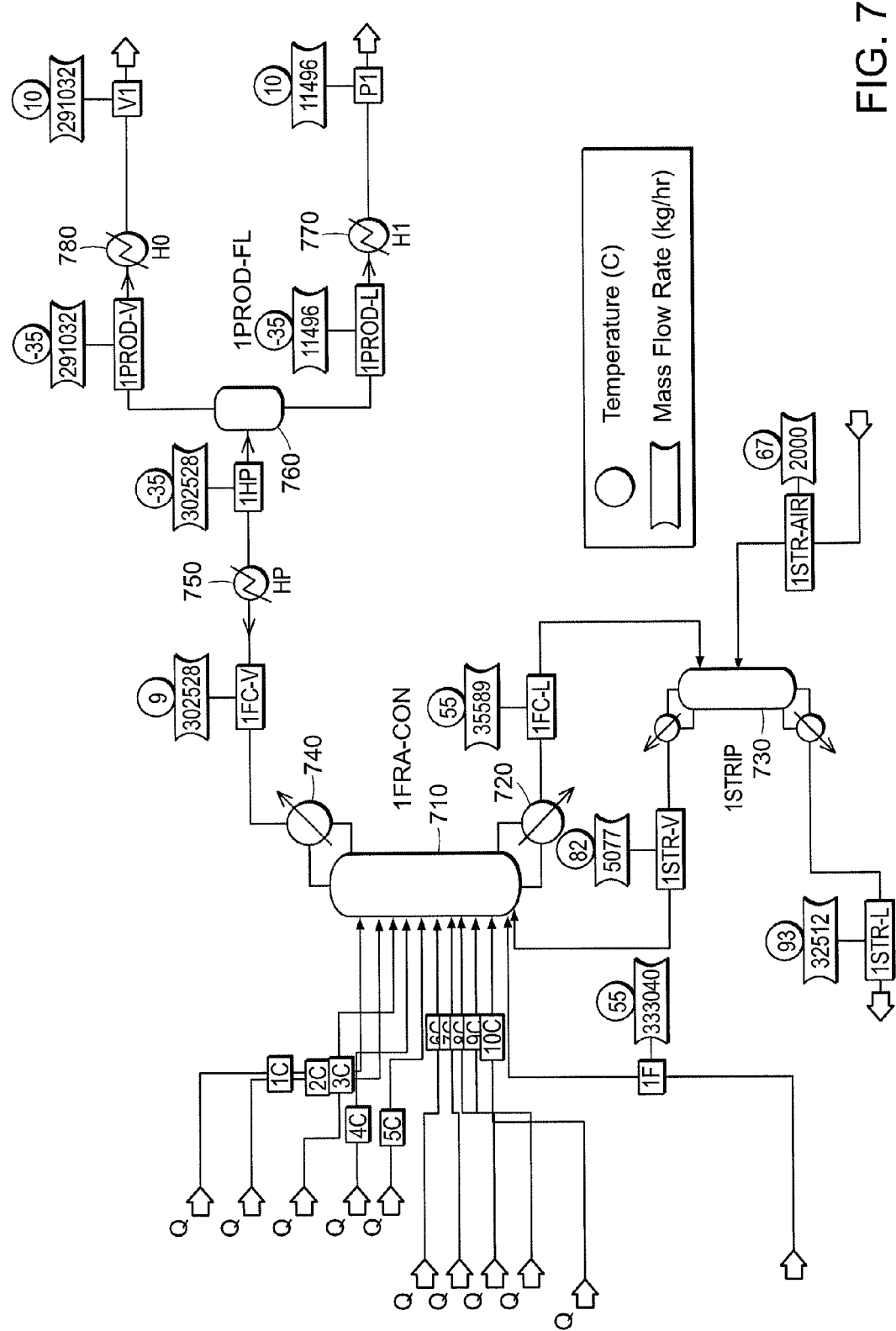
FIG. 7 provides a model flowsheet for an ethanol recovery process using fractional condensation of a feed mixture (vapor feed with 2 mol % Ethanol, 15.3 mol % water, 64.2 mol % $N_2$, 17.5 mol % $O_2$ and 1 mol % $CO_2$) with initial temperature of about 55° C.

Ethanol Recovery Using Fractional Condensation of a Feed Mixture Obtained in a Thermophilic Process FIG. 7 provides the model flowsheet for an ethanol recovery process using fractional condensation of a feed mixture with initial temperature of about 55° C., which can be obtained, for example, from a photobioreactor using thermophiles to produce one or more volatile organic compounds (i.e. a photobioreactor running a thermophilic process). 710 is the FC column, 720 is the bottom stage of the column with zero duty, 730 is the stripping column to recover ethanol from column bottom stream 1FC-L. 740 is the top condenser, 750 is the product condenser, and 760 is flash drum of 750. 770 and 780 are the product heat exchangers for heat integration. IF is the vent stream from solar converter feeding the FCcolumn. 1STR-AIR is the air stream used to strip out ethanol in 730. 1STR-V is the vent from the stripper 730 that contains recovered ethanol from FC bottom 1FC-L. 1STR-L is the recycle stream that is poor in ethanol. 1FC-V is the vent stream from the top of the FC column. 1PROD-V is the vent stream of the product condenser, 1PROD-L is the liquid product stream. V1 is vent, P1 is product. The feed (i.e., feed mixture) consists of 2 mol % EtOH, the FC column has 12 stages with 10 coolers in addition to a condenser. There is a 10 stage air stripper to recover ethanol from the FC column bottom. This process can have an ethanol production rate of 10561 KgEtOH/h (28.3 MGY) of 93.1 wt % (relative purity), 91.9 wt % (absolute purity). After heat integration, as discussed below, the primary energy duties are (given in PEU): Cooling=−6.00 MJ/Kg EtOH, Heating=1.14 MJ/Kg EtOH. Column top temperature is Ttop=9.01° C., and bottom temperature is TBot=54.7° C. The ethanol recovery yield is 96.9%. The baseline conditions for FIG. 7 are: Feed: 2 mol % EtOH, feed mixture temperature is 55° C., 10 Cooler FC, 10 stage Air Stripper; Product: 10561 KgEtOH/h (28.3 MGY) 93.1 wt % (Rel.), 91.9 wt % (Abs.) Integrated PEU: Cool=− 6.00 MJ, Heat=1.14 MJ/(kg EtOH), Ttop=9.01° C., TBot=54.7° C. The feed stream conditions from the process are listed in below table, Table 6:

| | 1F | 1FC-L | 1FC-V | 1HP | 1PROD-L | 1PROD-V | 1STR-AIR | 1STR-L | 1STR-V |
|---|---|---|---|---|---|---|---|---|---|
| Temperature C. | 5.500E+01 | 5.468E+01 | 9.005E+00 | −3.500E+01 | −3.500E+01 | −3.500E+01 | 6.700E+01 | 9.286E+01 | 8.167E+01 |
| Pressure atm | 1.000E+00 | 1.000E+00 | 1.000E+00 | 1.000E+00 | 1.000E+00 | 1.000E+00 | 1.000E+00 | 1.000E+00 | 1.000E+00 |
| Vapor Frac | 1.000E+00 | 0.000E+00 | 1.000E+00 | 9.732E−01 | 0.000E+00 | 1.000E+00 | 1.000E+00 | 0.000E+00 | 1.000E+00 |
| Solid Frac | 0.000E+00 | 0.000E+00 | 0.000E+00 | 0.000E+00 | 0.000E+00 | 0.000E+00 | 0.000E+00 | 0.000E+00 | 0.000E+00 |
| Mole Flow kmol/hr | 1.202E+04 | 1.923E+03 | 1.029E+04 | 1.029E+04 | 2.763E+02 | 1.002E+04 | 6.953E+01 | 1.799E+03 | 1.943E+02 |
| Mass Flow kg/hr | 3.330E+05 | 3.559E+04 | 3.025E+05 | 3.025E+05 | 1.150E+04 | 2.910E+05 | 2.000E+03 | 3.251E+04 | 5.077E+03 |

-continued

|  | 1F | 1FC-L | 1FC-V | 1HP | 1PROD-L | 1PROD-V | 1STR-AIR | 1STR-L | 1STR-V |
|---|---|---|---|---|---|---|---|---|---|
| Volume Flow l/min | 5.395E+06 | 6.215E+02 | 3.972E+06 | 3.263E+06 | 2.213E+02 | 3.262E+06 | 3.234E+04 | 5.866E+02 | 9.427E+04 |
| Enthalpy Gcal/hr | −1.285E+02 | −1.302E+02 | −2.835E+01 | −3.471E+01 | −1.901E+01 | −1.571E+01 | 2.040E−02 | −1.206E+02 | −7.011E+00 |
| Mass Flow kg/hr | | | | | | | | | |
| H2O | 3.314E+04 | 3.404E+04 | 8.037E+02 | 8.037E+02 | 7.829E+02 | 2.080E+01 | 0.000E+00 | 3.233E+04 | 1.704E+03 |
| ETHANOL | 1.108E+04 | 1.511E+03 | 1.090E+04 | 1.090E+04 | 1.056E+04 | 3.428E+02 | 0.000E+00 | 1.723E+02 | 1.339E+03 |
| N2 | 2.162E+05 | 2.538E+01 | 2.178E+05 | 2.178E+05 | 1.149E+01 | 2.178E+05 | 1.580E+03 | 4.831E+00 | 1.601E+03 |
| O2 | 6.732E+04 | 9.174E+00 | 6.774E+04 | 6.774E+04 | 5.031E+00 | 6.773E+04 | 4.200E+02 | 1.415E+00 | 4.278E+02 |
| CO2 | 5.291E+03 | 6.069E+00 | 5.291E+03 | 5.291E+03 | 1.347E+02 | 5.156E+03 | 0.000E+00 | 1.130E−20 | 6.069E+00 |
| Mass Frac | | | | | | | | | |
| H2O | 9.950E−02 | 9.564E−01 | 2.656E−03 | 2.656E−03 | 6.810E−02 | 7.150E−05 | 0.000E+00 | 9.945E−01 | 3.356E−01 |
| ETHANOL | 3.326E−02 | 4.246E−02 | 3.605E−02 | 3.605E−02 | 9.187E−01 | 1.178E−03 | 0.000E+00 | 5.299E−03 | 2.637E−01 |
| N2 | 6.492E−01 | 7.130E−04 | 7.199E−01 | 7.199E−01 | 9.990E−04 | 7.483E−01 | 7.900E−01 | 1.486E−04 | 3.153E−01 |
| O2 | 2.021E−01 | 2.580E−04 | 2.239E−01 | 2.239E−01 | 4.380E−04 | 2.327E−01 | 2.100E−01 | 4.350E−05 | 8.426E−02 |
| CO2 | 1.589E−02 | 1.710E−04 | 1.749E−02 | 1.749E−02 | 1.172E−02 | 1.772E−02 | 0.000E+00 | 3.470E−25 | 1.195E−03 |
| Mole Flow kmol/hr | | | | | | | | | |
| H2O | 1.839E+03 | 1.889E+03 | 4.461E+01 | 4.461E+01 | 4.346E+01 | 1.154E+00 | 0.000E+00 | 1.795E+03 | 9.457E+01 |
| ETHANOL | 2.404E+02 | 3.280E+01 | 2.367E+02 | 2.367E+02 | 2.293E+02 | 7.440E+00 | 0.000E+00 | 3.740E+00 | 2.906E+01 |
| N2 | 7.718E+03 | 9.061E−01 | 7.774E+03 | 7.774E+03 | 4.101E−01 | 7.774E+03 | 5.640E+01 | 1.725E−01 | 5.714E+01 |
| O2 | 2.104E+03 | 2.867E−01 | 2.117E+03 | 2.117E+03 | 1.572E−01 | 2.117E+03 | 1.313E+01 | 4.422E−02 | 1.337E+01 |
| CO2 | 1.202E+02 | 1.379E−01 | 1.202E+02 | 1.202E+02 | 3.061E+00 | 1.172E+02 | 0.000E+00 | 2.560E−22 | 1.379E−01 |
| Mole Frac | | | | | | | | | |
| H2O | 1.530E−01 | 9.823E−01 | 4.334E−03 | 4.334E−03 | 1.573E−01 | 1.152E−04 | 0.000E+00 | 9.978E−01 | 4.868E−01 |
| ETHANOL | 2.000E−02 | 1.705E−02 | 2.300E−02 | 2.300E−02 | 8.296E−01 | 7.428E−04 | 0.000E+00 | 2.079E−03 | 1.496E−01 |
| N2 | 6.420E−01 | 4.710E−04 | 7.553E−01 | 7.553E−01 | 1.484E−03 | 7.761E−01 | 8.112E−01 | 9.590E−05 | 2.941E−01 |
| O2 | 1.750E−01 | 1.490E−04 | 2.057E−01 | 2.057E−01 | 5.690E−04 | 2.113E−01 | 1.888E−01 | 2.460E−05 | 6.881E−02 |
| CO2 | 1.000E−02 | 7.170E−05 | 1.168E−02 | 1.168E−02 | 1.108E−02 | 1.170E−02 | 0.000E+00 | 1.430E−25 | 7.098E−04 |

Figure 8:
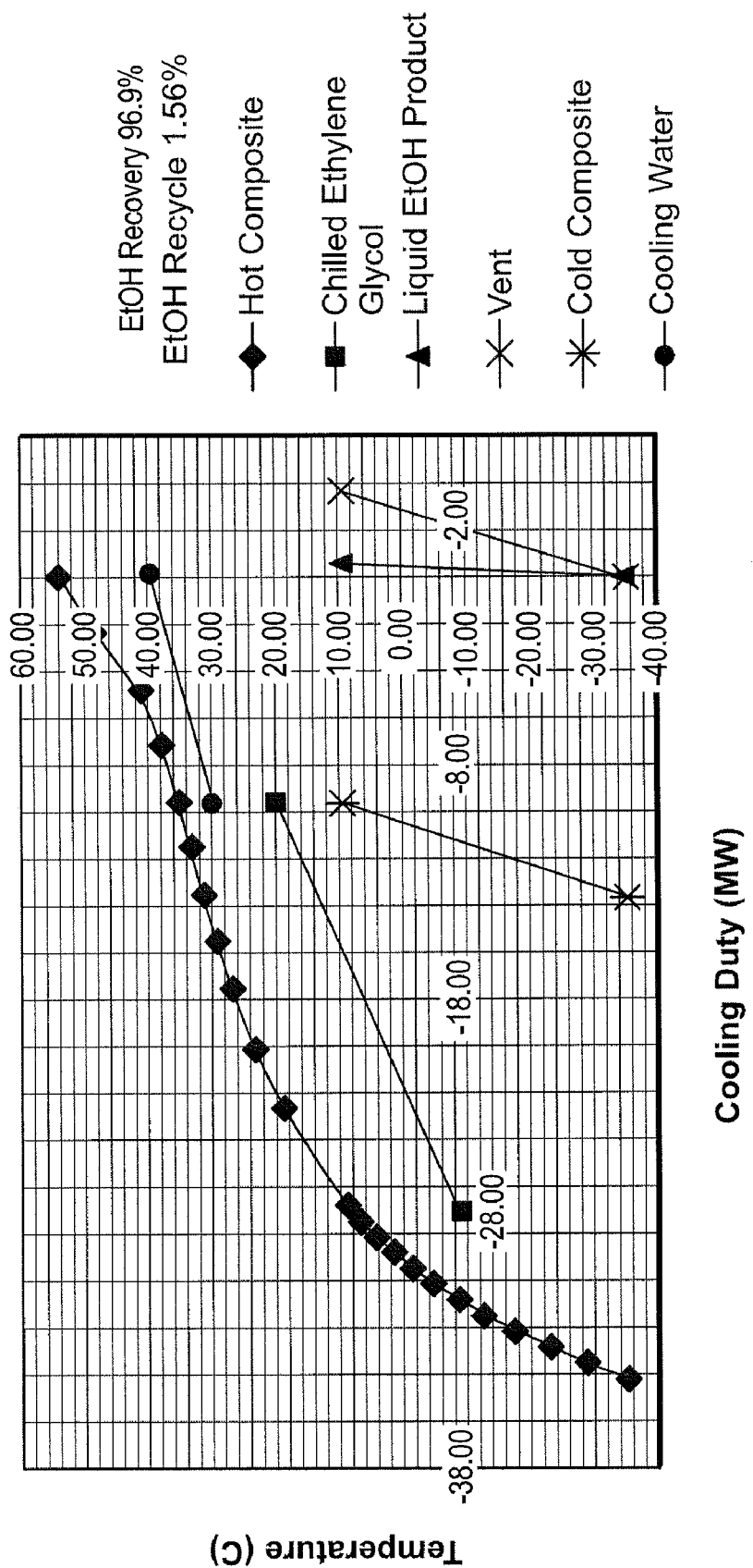
FIG. 8 is an energy integration diagram (including heat integration) for the model flowsheet represented in FIG. 7.

FIG. 8 provides the heat integration diagram for Ethanol recovery with Fractional Condensation using Pinch Technology. The top is the hot composite curve consists of all the duties of the hot streams that need cooling. The cold composite curve represents the cooling duties of cold streams available to be heated up. The cooling water line indicates that cooling water can be used to provide some of the column cooling duty for the 5 coolers at the bottom of the column. While the "deeper" cold resource from the cold product streams (the cold composite) can be used to cool glycol, the latter can then be used to cool the air. The rest of the cooling has to be provided by external sources. Heat integration can save 3.08 MW of primary energy cooling duty, which is equivalent to 1.05 MJ (PEU)/kg EtOH. So the total primary energy based duties after heat integration are: Cooling=6.00 MJ PEU/kg EtOH, Heating=1.14 MJ PEU/Kg EtOH. Baseline Conditions for FIG. 8: Feed: 2 mol % EtOH, feed mixture at 55° C., for example, obtained from a photobioreactor running a thermophilic process, 10 Cooler FC, 10 stage air stripper; product: 10561 KgEtOH/h (28.3 MGY); 93.1 wt % (Rel.), 91.9 wt % (Abs.). Integrated PEU: Cool=−6.00 MJ, Heat=1.14 MJ/KgEtOH; Ttop=9.01° C., TBot=54.7° C.

Example 3

Ethanol Recovery Using Fractional Condensation of a Feed Mixture Obtained in a Thermophilic Process, Utilizing a "Duty-Free" Section Using Solar Heating In addition to what has been discussed above, a "duty-free" section is designed to enhance the separation in the FC column (also referred to herein as "solar heating"). That is, cooling duty is not applied in the bottom sections (i.e., the last six stages including the reboiler with no heating duty) of the fractional condensation column, so that the 55° C. feed mixture vapor stream, for example, from a photobioreactor, which embodies solar heat energy, can be used as "re-boiled" vapor to directly heat the bottom sections of the FC column, and the condensed water also releases latent heat to partially heat and vaporize the liquids again on these bottom stages.

Figure 9:
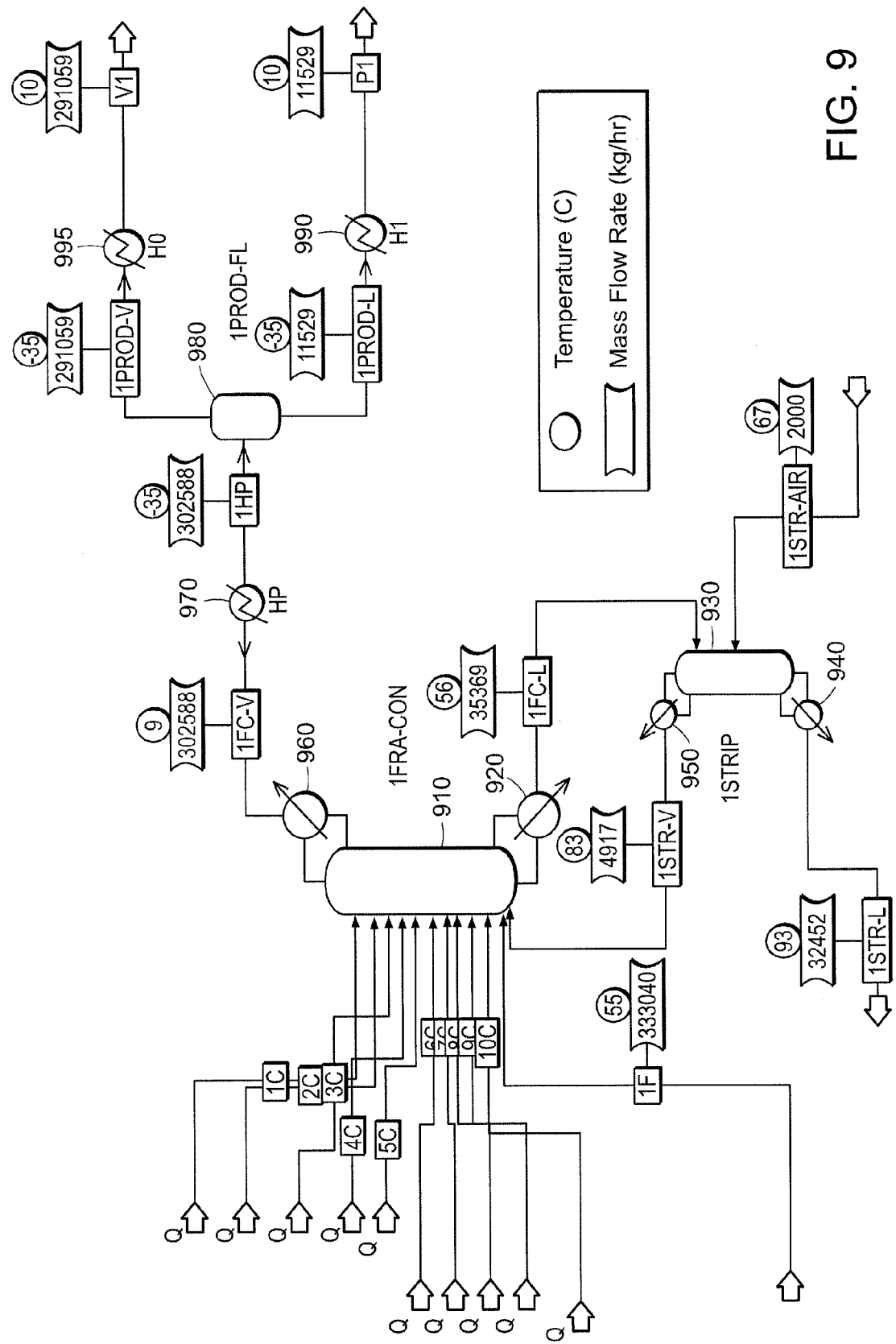
FIG. 9 provides a model flowsheet for an ethanol recovery process using fractional condensation of a feed mixture (vapor feed with 2 mol % Ethanol, 15.3 mol % water, 64.2 mol % $N_2$, 17.5 mol % $O_2$ and 1 mol % $CO_2$) with initial temperature of about 55° C., providing no duty to the bottom section of the fractional condensation column (i.e., solar heating).

FIG. 9 shows the corresponding process model flowsheet with stream temperature and flow rates. 910 is the FC column. 920 is the bottom stage of the column with zero duty. 930 is the air stripper, 940 is the reboiler, 950 is the top stage of the air stripper with zero duty. 960 is the top condenser of FC column, 970 is the product condenser, 980 is the flash drum of condenser 970. 990 and 995 are exchangers for heat integration. 1F is from solar converter vent feeding the FC column. 1PROD-V is the vent of the product condenser, 1PROD-L is the liquid ethanol product stream, 1FC-V and 1FC-L are the top and bottom streams of FC column. 1STR-AIR is the stripping air to 930, and 1STR-L is the ethanol poor recycle stream from the bottom of 930 to solar converter. 1STR-V is vapor from 930 with recovered ethanol from 1FC-L.

The below table, Table 7 provides corresponding simulation report information. The feed with 2 mol % EtOH at 55° C., for example, from a photobioreactor or photobioreactor array is fed into the column that has 10 coolers and 17 Stages. The product stream has 10696 KgEtOH/h (28.7 MGY) flow rate at 93.8 wt % (relative EtOH concentration), 92.8 wt % (absolute). The cooling duty after heat integration on primary energy unit basis is PEU: Cooling=−5.92 MJ/kgEtOH, Heating=1.12 MJ/KgEtOH. The column top temperature is at Ttop=8.92° C., and the bottom is at TBot=55.6° C. Ethanol recovery is 96.9%.

|  | 1F | 1FC-L | 1FC-V | 1HP | 1PROD-L | 1PROD-V | 1STR-AIR | 1STR-L | 1STR-V |
|---|---|---|---|---|---|---|---|---|---|
| Temperature C. | 5.500E+01 | 5.563E+01 | 8.919E+00 | −3.500E+01 | −3.500E+01 | −3.500E+01 | 6.700E+01 | 9.343E+01 | 8.335E+01 |
| Pressure atm | 1.000E+00 | 1.000E+00 | 1.000E+00 | 1.000E+00 | 1.000E+00 | 1.000E+00 | 1.000E+00 | 1.000E+00 | 1.000E+00 |

-continued

|  | 1F | 1FC-L | 1FC-V | 1HP | 1PROD-L | 1PROD-V | 1STR-AIR | 1STR-L | 1STR-V |
|---|---|---|---|---|---|---|---|---|---|
| Vapor Frac | 1.000E+00 | 0.000E+00 | 1.000E+00 | 9.733E-01 | 0.000E+00 | 1.000E+00 | 1.000E+00 | 0.000E+00 | 1.000E+00 |
| Solid Frac | 0.000E+00 | 0.000E+00 | 0.000E+00 | 0.000E+00 | 0.000E+00 | 0.000E+00 | 0.000E+00 | 0.000E+00 | 0.000E+00 |
| Mole Flow kmol/hr | 1.202E+04 | 1.926E+03 | 1.029E+04 | 1.029E+04 | 2.744E+02 | 1.002E+04 | 6.953E+01 | 1.800E+03 | 1.957E+02 |
| Mass Flow kg/hr | 3.330E+05 | 3.537E+04 | 3.026E+05 | 3.026E+05 | 1.153E+04 | 2.911E+05 | 2.000E+03 | 3.245E+04 | 4.917E+03 |
| Volume Flow l/min | 5.395E+06 | 6.166E+02 | 3.970E+06 | 3.263E+06 | 2.225E+02 | 3.263E+06 | 3.234E+04 | 5.853E+02 | 9.543E+04 |
| Enthalpy Gcal/hr | −1.285E+02 | −1.304E+02 | −2.828E+01 | −3.461E+01 | −1.885E+01 | −1.576E+01 | 2.040E−02 | −1.207E+02 | −7.107E+00 |
| Mass Flow kg/hr |  |  |  |  |  |  |  |  |  |
| H2O | 3.314E+04 | 3.426E+04 | 7.258E+02 | 7.258E+02 | 7.061E+02 | 1.971E+01 | 0.000E+00 | 3.241E+04 | 1.850E+03 |
| ETHANOL | 1.108E+04 | 1.069E+03 | 1.104E+04 | 1.104E+04 | 1.070E+04 | 3.461E+02 | 0.000E+00 | 3.482E+01 | 1.034E+03 |
| N2 | 2.162E+05 | 2.490E+01 | 2.178E+05 | 2.178E+05 | 1.135E+02 | 2.178E+05 | 1.580E+03 | 4.752E+01 | 1.600E+03 |
| O2 | 6.732E+04 | 8.987E+00 | 6.774E+04 | 6.774E+04 | 4.972E+00 | 6.773E+04 | 4.200E+02 | 1.391E+00 | 4.276E+02 |
| CO2 | 5.291E+03 | 5.554E+00 | 5.291E+03 | 5.291E+03 | 1.104E+02 | 5.180E+03 | 0.000E+00 | 4.010E−16 | 5.554E+00 |
| Mass Frac |  |  |  |  |  |  |  |  |  |
| H2O | 9.950E−02 | 9.687E−01 | 2.399E−03 | 2.399E−03 | 6.125E−02 | 6.770E−05 | 0.000E+00 | 9.987E−01 | 3.762E−01 |
| ETHANOL | 3.326E−02 | 3.022E−02 | 3.649E−02 | 3.649E−02 | 9.278E−01 | 1.189E−03 | 0.000E+00 | 1.070E−03 | 2.103E−01 |
| N2 | 6.492E−01 | 7.040E−04 | 7.198E−01 | 7.198E−01 | 9.850E−04 | 7.482E−01 | 7.900E−01 | 1.500E−04 | 3.254E−01 |
| O2 | 2.021E−01 | 2.540E−04 | 2.239E−01 | 2.239E−01 | 4.310E−04 | 2.327E−01 | 2.100E−01 | 4.290E−05 | 8.696E−02 |
| CO2 | 1.589E−02 | 1.570E−04 | 1.749E−02 | 1.749E−02 | 9.579E−03 | 1.780E−02 | 0.000E+00 | 1.240E−20 | 1.130E−03 |
| Mole Flow kmol/hr |  |  |  |  |  |  |  |  |  |
| H2O | 1.839E+03 | 1.902E+03 | 4.029E+01 | 4.029E+01 | 3.920E+01 | 1.094E+00 | 0.000E+00 | 1.799E+03 | 1.027E+02 |
| ETHANOL | 2.404E+02 | 2.320E+01 | 2.397E+02 | 2.397E+02 | 2.322E+02 | 7.512E+00 | 0.000E+00 | 7.558E−01 | 2.245E+01 |
| N2 | 7.718E+03 | 8.889E−01 | 7.774E+03 | 7.774E+03 | 4.053E−01 | 7.774E+03 | 5.640E+01 | 1.696E−01 | 5.712E+01 |
| O2 | 2.104E+03 | 2.808E−01 | 2.117E+03 | 2.117E+03 | 1.554E−01 | 2.117E+03 | 1.313E+01 | 4.347E−02 | 1.336E+01 |
| CO2 | 1.202E+02 | 1.262E−01 | 1.202E+02 | 1.202E+02 | 2.509E+00 | 1.177E+02 | 0.000E+00 | 9.110E−18 | 1.262E−01 |
| Mole Frac |  |  |  |  |  |  |  |  |  |
| H2O | 1.530E−01 | 9.873E−01 | 3.915E−03 | 3.918E−03 | 1.428E−01 | 1.092E−04 | 0.000E+00 | 9.995E−01 | 5.246E−01 |
| ETHANOL | 2.000E−02 | 1.205E−02 | 2.329E−02 | 2.329E−02 | 8.460E−01 | 7.500E−04 | 0.000E+00 | 4.200E−04 | 1.147E−01 |
| N2 | 6.420E−01 | 4.610E−04 | 7.554E−01 | 7.554E−01 | 1.477E−03 | 7.761E−01 | 8.112E−01 | 9.420E−05 | 2.918E−01 |
| O2 | 1.750E−01 | 1.460E−04 | 2.057E−01 | 2.057E−01 | 5.660E−04 | 2.113E−01 | 1.888E−01 | 2.410E−05 | 6.827E−02 |
| CO2 | 1.000E−02 | 6.550E−05 | 1.168E−02 | 1.168E−02 | 9.143E−03 | 1.175E−02 | 0.000E+00 | 5.060E−21 | 6.447E−04 |

Figure 10:
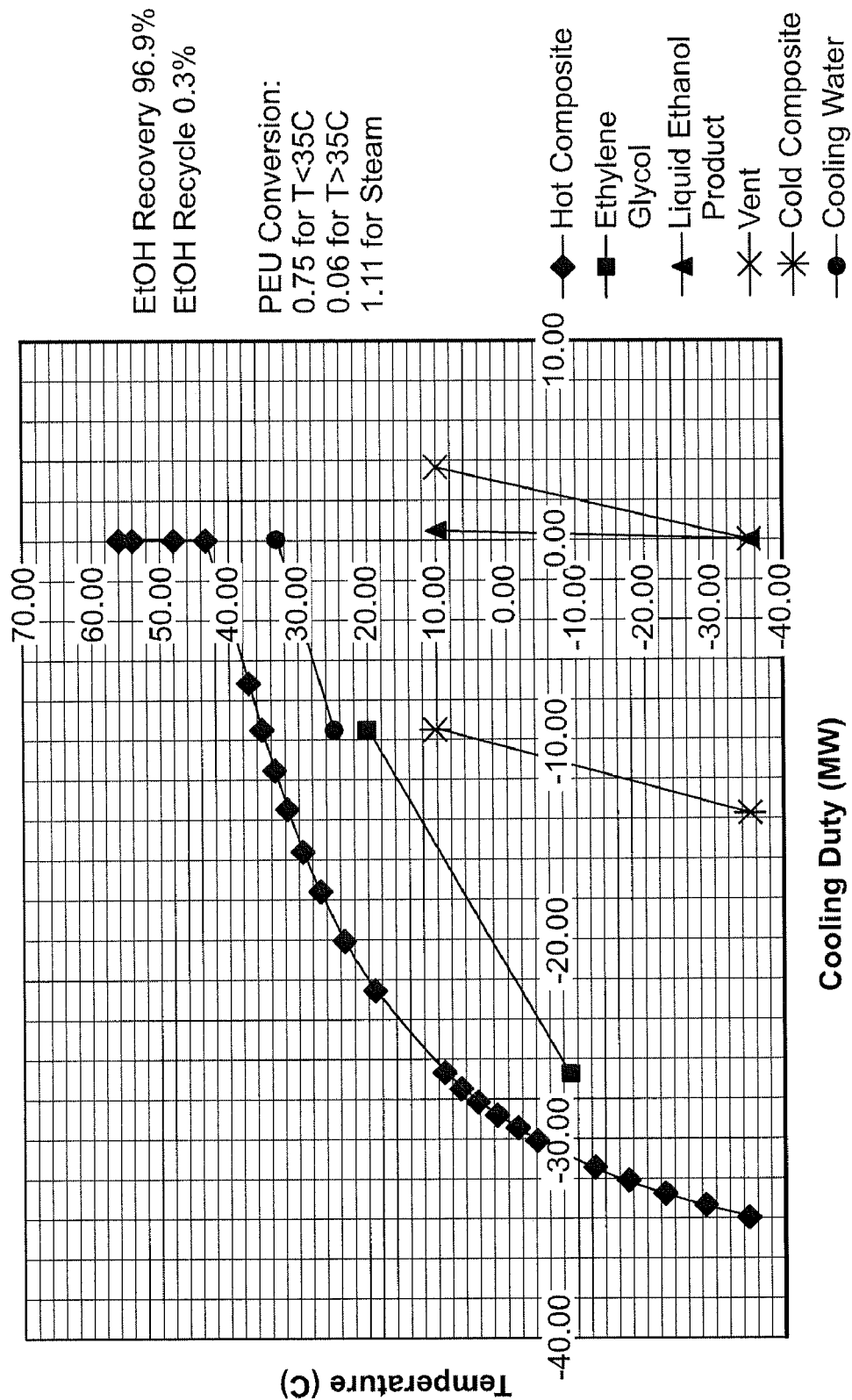
FIG. 10 provides an energy integration diagram (including heat integration and solar heating) for the modeling case represented in FIG. 9.

FIG. 10 is the heat integration diagram for the above flowsheet process as illustrated in FIG. 9 and Table 7. It can be seen that heat integration can save about 3.08 MW (primary energy basis) of cooling, which is equivalent to 1.03 MJ (PEU)/KgEtOH. So, the total duties for the process on PEU basis are: Cooling=−5.92 MJ/KgEtOH, Heating=1.12 MJ/KgEtOH (for stripper column). Simulation baseline conditions for FIG. 10 are: Feed: 2 mol % EtOH, feed mixture temperature is 55° C., 17 Stage FC column including 10 coolers, 10 stage Air Stripper. Product: 10696 KgEtOH/h (28.7 MGY), 93.8 wt % (Rel.), 92.8 wt % (Abs.) Integrated PEU: Cool=−5.92 MJ/kgEtOH, Heat=1.12 MJ/KgEtOH Ttop=8.92° C., TBot=55.6° C.

Figure 11:
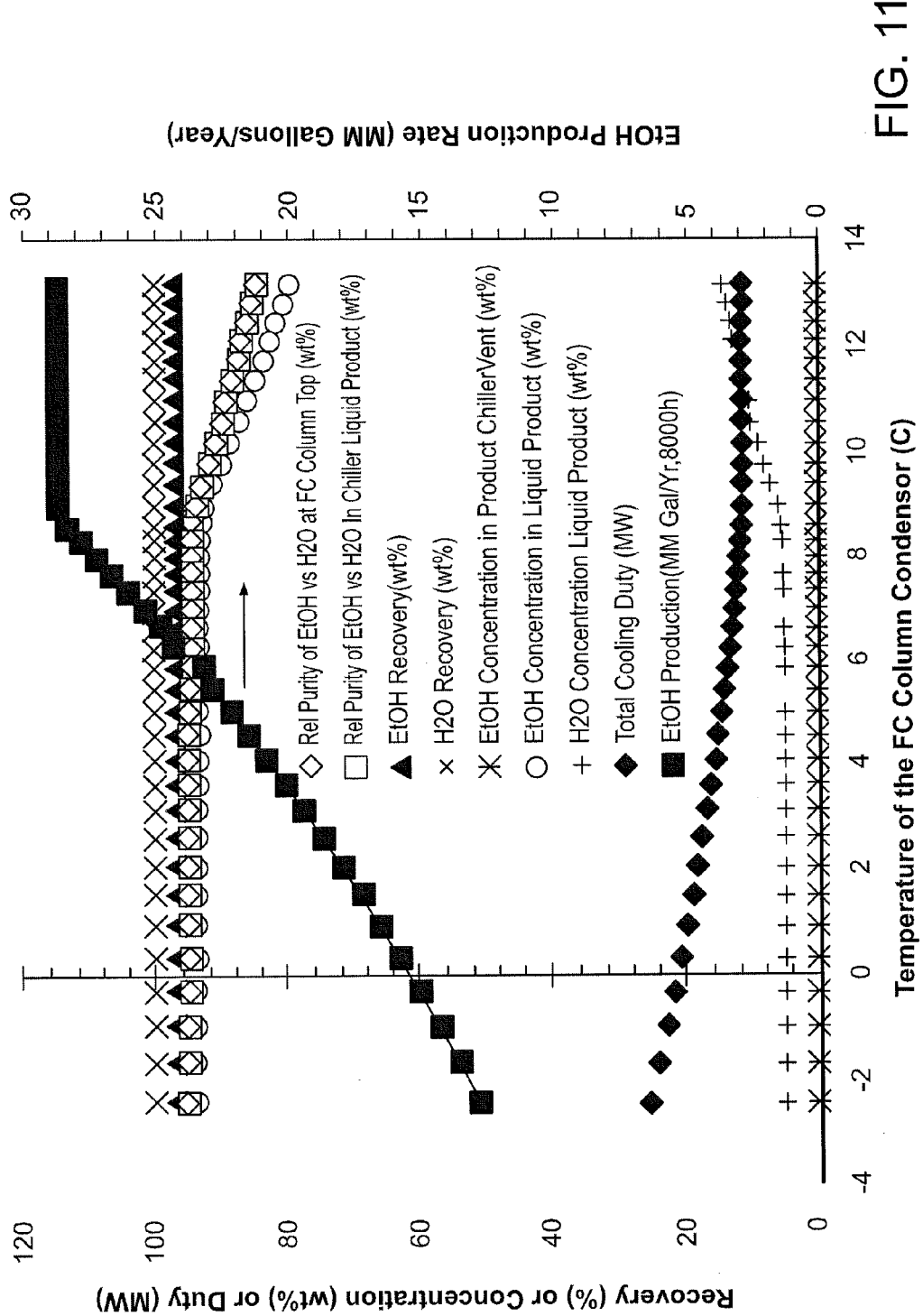
FIG. 11 is a graphical representation of various parameters including product ethanol concentration, recovery yield, productivity and cooling duty versus the FC column top condenser temperature for a feed mixture (vapor feed with 2 mol % Ethanol, 15.3 mol % water, 64.2 mol % $N_2$, 17.5 mol % $O_2$ and 1 mol % $CO_2$) at a temperature of about 55° C.

FIG. 11 is a key sensitivity study plot of product ethanol concentration, recovery yield, productivity and cooling duty versus the top condenser temperature of the fractional condensation column. Evidently, there is a preferred operation "region" where there exists a trade off among productivity, yield and cooling duty. The FC column top condenser temperature in this region is between 7.5° C.~9.5° C. The baseline conditions for FIG. 11 are: Feed: 2 mol % EtOH, SC@55° C., 10 cCooler, 17 stg FC column, 10 Stg Air Stripper; Product: 10696 KgEtOH/h (28.7 MGY) 93.8 wt % (Rel.), 92.8 wt % (Abs.) Integrated PEU: Cooling=−5.92 MJ/kgEtOH, Heat=1.12 MJ/KgEtOH Ttop=8.92° C., TBot=55.6° C.

Figure 12:
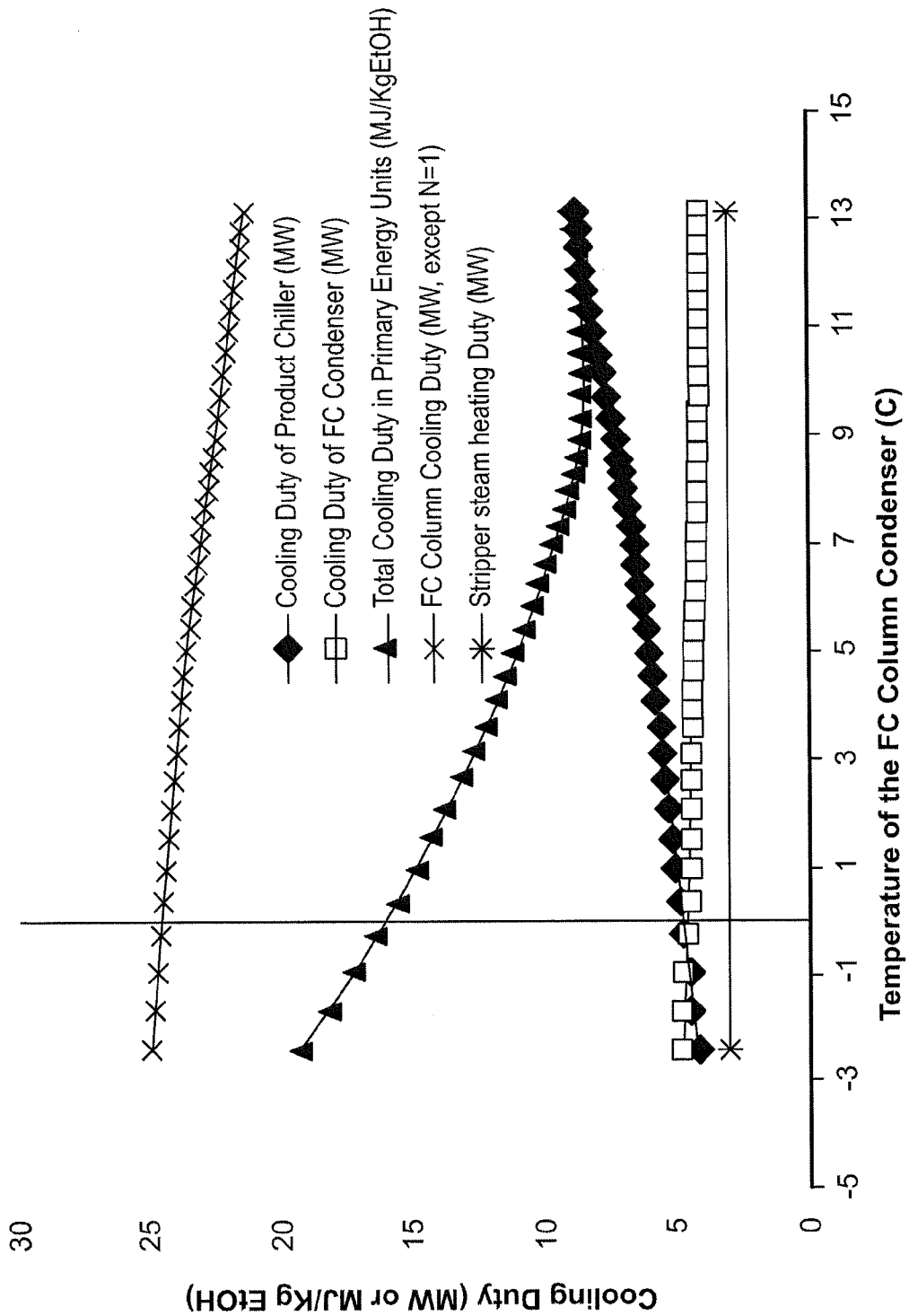
FIG. 12 is a graphical representation of the cooling/heating duty versus the FC column to condenser temperature for the modeling case represented in FIG. 9.

FIG. 12 indicates that the minimum total cooling duty occurs at a condenser temperature of ~9° C. The Baseline condition for FIG. 17: Feed: 2 mol % EtOH, feed mixture temperature is 55° C. (e.g., provided by a photobioreactor or photobioreactor array cultivating thermophiles at 55° C.), 10 Cooler, 17 stg FC column, 10 Stg Air Stripper; Product: 10696 KgEtOH/h (28.7 MGY) 93.8 wt % (Rel.), 92.8 wt % (Abs.) Integrated PEU: Cool=−5.92 MJ/kgEtOH, Heat=1.12 MJ/KgEtOH; Ttop=8.92° C., TBot=55.6° C.

Figure 13:
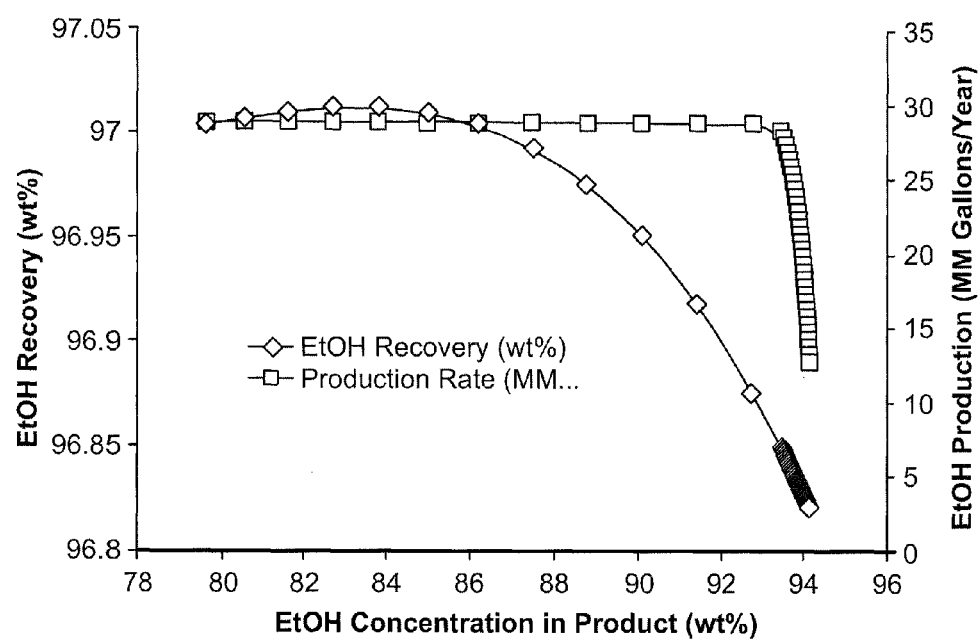
FIG. 13 is a graphical representation of the ethanol recovery and production rate versus the ethanol concentration.

FIG. 13 is the expanded diagram of ethanol productivity and recovery versus ethanol concentration in product. The productivity drops sharply after 93.5 wt % while the recovery yield does not change a lot. Baseline Condition for FIG. 13: Feed: 2 mol % EtOH, feed mixture temperature at about 55° C., 10 Cooler, 17 stage FC Column, 10 Stg Air Stripper. Product: 10696 KgEtOH/h (28.7 MGY); 93.8 wt % (Rel.), 92.8 wt % (Abs.) Integrated PEU: Cool=−5.92 MJ/kgEtOH, Heat=1.12 MJ/KgEtOH; Ttop=8.92° C., TBot=55.6° C.

Example 4

The fractional distillation/condensation column shown in FIG. 14 was used in the below examples.

Distillations were performed, both with liquid feedstock (liquid feed mixture for batch distillation) and vapor feedstock (vapor feed mixture for continuous distillation).

Liquid Feeding with Ethanol Water Feed Mixtures

A single fractional distillation column module was used. The packing height was 0.66 m, ID was 1.5", and the fractional condensation volume was packed with 3 mm glass beads (internal packing). The column had 1 mm perforated openings on a support located at the bottom of each module for vapor and liquid to go through. A three liter flask was used as a reboiler, filled with one liter stock solution (1~3 wt % ethanol in an ethanol-water mixture) prior to operation. The column top temperature was controlled at about 74° C. to about 93° C., the column bottom temperature was controlled at about 100° C. (controller setting between about 100° C. and about 104° C.). Ambient cooling was found to be sufficient to condense the distillate. The packed column was heated by flowing heated water through the internal coil (i.e., internal heating with fluid tube) and the jacket volume (external heating).

The results of runs A, B, C and D are listed in Table 8 (see below). For liquid feedings (1 liter) to the reboiler flask at 1~3 wt % ethanol in an ethanol-water mixture, the distillate purity of ethanol reached higher than 80% with ethanol recovery yields of 55% to 74% for run time periods of 5 to 8 hours. Higher recovery values (about 96%) are modeled for longer run times. Near complete ethanol recovery is obtained for continuous distillation runs.

Vapor Feeding (Ethanol-Water-$N_2$-$O_2$ feed mixture) at 1 vvm

A single fractional distillation column module was used. The packing height was 0.66 m, ID was 1.5", the fractional condensation volume was packed with 3 mm glass beads (internal packing). A six mm perforated packing support with stainless steel meshes was used. 1 mm beads were used to fill the column jacket volume to further enhance insulation and to create even better temperature control of the column. The vapor feed was directly injected into the column bottom which had a controlled temperature of about 38° C. The column top temperature was controlled at about 7 to about 12° C. The vapor feedstock (vapor feed mixture) was prepared using a jacketed glass reactor as a stripper. One liter of known concentration (4~5 wt %) ethanol in water was put into the reactor while sparging 1 vvm air into the liquid volume of the reactor to generate a 2~3 mole % ethanol vapor for feeding into the column module at a temperature of 37~38° C. Water condensed in the column, ethanol with air vented at the top of the column, and was then cooled to about −40° C. to obtain high purity ethanol.

Rows K, L and M in Table 8 are three typical runs made with vapor feeding to the bottom of the column. Theoretical models using Aspen Plus V7.0 yield that this column can concentrate ethanol to as high as 93 wt % with 96% recovery yield.

TABLE 8

| Run | Feed | Liquid Feed/Stock Solution EtOH wt % | Vapor Feed EtOH Mole % | T (top heating or cooling fluid) (° C.) | T (mid) (° C.) | T (bottom heating or cooling fluid) (° C.) | Distillate Liquid EtOH wt % (avg.) | Distillate Liquid EtOH wt % (high) | Error at 95% CI | EtOH Recovery* |
|---|---|---|---|---|---|---|---|---|---|---|
| A | L | 3.00% | | 74 | 83 | 103.0 | 74.37 | 78.41 | 5.76% | 74.12% |
| B | L | 3.00% | | 74 | 82.5 | 103.0 | 75.33 | 81.96 | 2.02% | 63.99% |
| C | L | 1.00% | | 85~93 | 89~93 | 104.5 | 68.00 | 75.20 | 1.78% | 68.14% |
| D | L | 2.00% | | 82~93 | 85~95 | 105.0 | 61.89 | 63.66 | 2.39% | 55.42% |
| K | V | 4.00% | <3% | 6.5 | 15.5 | 38~41 | 74.92 | 78.04 | 1.37% | 63.00% |
| L | V | 5.00% | <3% | 5 | 12.7 | 38.5 | 79.92 | 80.34 | 1.12% | 43.20% |
| M | V | 4.00% | <3% | 13 | 16 | 38 | 77.39 | 79.74 | 6.33% | 84.20% |

All the values in Table 8 were determined using GC analysis. For example, Table 9 is a typical GC analysis output with 400 fold dilution of distillate samples for run B in Table 8, and Table 10 presents the GC analysis results for run M in Table 8.

The following table, Table 9, provides the GC Analysis Results for Liquid Feeding according to Case B in Table 8. The analyses were performed for samples obtained from an ethanol distillation using 1 mm perforated support and 3 mm beads. The bottom temperature (i.e., $T_N$) of the fractional distillation/condensation column was 103° C., the middle temperature was 82° C. (measured at the center of the column through a sampling port), and the temperature of the outer water jacket at the top was 100° C. Tcool/Heat was 90.3° C. (i.e., heating water temperature entering the top core coil (location 130 top in FIG. 14) of the FC column). For the series of GC samples (note that a and b in the "GC Sample" column refer to the same sample, e.g. rows 1a and 1b refer to the same sample) the following results were obtained, The average distillate ethanol concentration was determined to be 75.33 wt % and the recovery yield was determined to be 63.99%. 400 fold dilution was used before taking the distillate samples for accurate GC measurement,

TABLE 9

| GC Sample* | Sample & GC Time | Sample Time | Acetaldehyde (mg/L) | Acetaldehyde 95% CI (±mg/L) | Ethanol (mg/L) | Ethanol 95% CI (±mg/L) | Ethanol (undiluted) g/l | Ethanol wt % | Error % |
|---|---|---|---|---|---|---|---|---|---|
| 0a | Bottom t = 0 | 9:45 am | 5.57 | 0.17 | 101.99 | 5.76 | 40.80 | 4.12% | 5.65% |
| 1a | Distillate | 10:10 am | 1.44 | 0.14 | 1646.67 | 28.58 | 658.67 | 76.50% | 1.74% |
| 1b | Distillate | 10:10 am | 1.20 | 0.14 | 1661.39 | 28.60 | 664.56 | 77.29% | 1.72% |
| 2a | Distillate | 10:30 am | 1.16 | 0.14 | 1525.84 | 28.46 | 610.34 | 70.06% | 1.87% |
| 2b | Distillate | 10:30 am | 1.05 | 0.14 | 1524.27 | 28.46 | 609.71 | 69.97% | 1.87% |
| 3a | Distillate | 11:00 am | 1.01 | 0.14 | 1524.17 | 28.46 | 609.67 | 69.97% | 1.87% |

TABLE 9-continued

| GC Sample* | Sample & GC Time | Sample Time | Acetaldehyde (mg/L) | Acetaldehyde 95% Cl (±mg/L) | Ethanol (mg/L) | Ethanol 95% Cl (±mg/L) | Ethanol (undiluted) g/l | Ethanol wt % | Error % |
|---|---|---|---|---|---|---|---|---|---|
| 3b | Distillate | 11:00 am | 0.97 | 0.14 | 1533.28 | 28.46 | 613.31 | 70.45% | 1.86% |
| 4a | Distillate | 11:30 am | 0.95 | 0.14 | 1570.01 | 28.50 | 628.00 | 72.39% | 1.82% |
| 4b | Distillate | 11:30 am | 0.93 | 0.09 | 1580.65 | 28.51 | 632.26 | 72.96% | 1.80% |
| 6a | Distillate | 12:30 pm | 0.86 | 0.09 | 1608.54 | 28.54 | 643.42 | 74.45% | 1.77% |
| 6b | Distillate | 12:30 pm | 0.90 | 0.09 | 1625.88 | 28.56 | 650.35 | 75.38% | 1.76% |
| 7a | Distillate | 1:00 pm | 0.89 | 0.09 | 1624.49 | 28.55 | 649.79 | 75.30% | 1.76% |
| 7b | Distillate | 1:00 pm | 0.01 | 0.05 | 1619.56 | 28.55 | 647.83 | 75.04% | 1.76% |
| 8a | Distillate | 2:30 pm | 0.85 | 0.09 | 1730.44 | 28.70 | 692.18 | 81.06% | 1.66% |
| 8a | Distillate | 2:30 pm | 0.93 | 0.09 | 1721.02 | 28.69 | 688.41 | 80.54% | 1.67% |
| 9a | Distillate | 3:30 pm | 0.81 | 0.09 | 1746.91 | 28.73 | 698.77 | 81.96% | 1.64% |
| 9a | Distillate | 3:30 pm | 0.84 | 0.09 | 1741.07 | 28.72 | 696.43 | 81.64% | 1.65% |
| 10a | Distillate | 4:30 pm | 0.79 | 0.08 | 1631.02 | 28.56 | 652.41 | 75.66% | 1.75% |
| 10a | Distillate | 4:30 pm | 0.79 | 0.08 | 1624.88 | 28.56 | 649.95 | 75.33% | 1.76% |
| 11a | Bottom t = end | 4:30 pm | 1.17 | 0.14 | 72.79 | 1.90 | 29.12 | 2.93% | 2.61% |
| 11a | Bottom t = end | 4:30 pm | 0.31 | 0.04 | 73.19 | 1.90 | 29.27 | 2.95% | 2.60% |

The following table, Table 10, provides the GC Analysis Results for Vapor Feeding according to Case M in Table 8. The analyses were performed for samples obtained from an ethanol distillation using matrix support and 3 mm beads. The bottom temperature (i.e., $T_N$) of the fractional distillation/condensation column was 36.5° C., the middle temperature was 16° C. (measured at the center of the column through the sampling port), and the water temperature entering the top core coil (location 130 top in FIG. 14) of the FC column was 13° C. For the series of GC samples (note that a and b in the "GC Sample" column refer to the same sample, e.g. rows 3a and 3b refer to the same sample) the following results were obtained. The average distillate ethanol concentration was determined to be 77.39 wt % and the recovery yield was determined to be 84.18%. 400 fold dilution was used before taking the distillate samples for accurate GC measurement.

ence of the column and along the column as shown here, however, in other embodiments of the present invention the column jacket volume can cover significantly less than the entire area of the column jacket as long as desired temperature profiles can be achieved during fractional condensation operation. The column jacket volume can be empty, evacuated or packed (i.e., filled, partly or entirely, with packing material). The column jacket further encloses the fractional condensation volume 160 and a fluid tube 150 (e.g., a central cooling/heating coil as shown here) positioned centrally therein. The fluid tube typically has inlets and outlets 130 that extend through the column jacket to the outside. The column jacket typically has inlets and outlets 140. The column further includes at least one inlet 170 (typically in the bottom as shown here) into the fractional condensation volume 160 and at least one outlet 180 (typically at the top as shown here)

TABLE 10

| GC Sample* | Notes | Sample Time | Acetaldehyde (mg/L) | Acetaldehyde 95% Cl (±mg/L) | Ethanol (mg/L) | Ethanol 95% Cl (±mg/L) | Ethanol (undiluted) g/l | Ethanol wt % | Error % |
|---|---|---|---|---|---|---|---|---|---|
| 0a | Reactor Stock Solution | 9:45 a | −0.01 | 0.03 | 100.23 | 15.05 | 40.09 | 4.05% | 15.01% |
| 0b | Reactor Stock Solution | 9:45 a | 0.01 | 0.03 | 100.20 | 15.05 | 40.08 | 4.05% | 15.02% |
| 1a | Stripper | 5:45 p | −0.01 | 0.03 | 80.54 | 3.18 | 32.22 | 3.25% | 3.95% |
| 1a | Stripper | 5:45 p | 0.07 | 0.03 | 79.36 | 3.17 | 31.74 | 3.20% | 3.99% |
| 2a | Top | 5:45 p | 0.03 | 0.03 | 1636.33 | 102.70 | 654.53 | 79.34% | 6.28% |
| 2b | Top | 5:45 p | 0.73 | 0.04 | 1603.04 | 102.56 | 641.22 | 77.39% | 6.40% |
| 3a | Bottom | 5:45 p | 1.23 | 0.05 | 16.31 | 0.49 | 6.52 | 0.65% | 3.00% |
| 3b | Bottom | 5:45 p | −0.01 | 0.03 | 15.26 | 0.49 | 6.11 | 0.61% | 3.19% |
| 10a | Reactor Stock Solution | 9:45 a | 0.04 | 0.03 | 100.66 | 15.04 | 40.27 | 4.07% | 14.94% |
| 10b | Reactor Stock Solution | 9:45 a | 0.16 | 0.03 | 102.10 | 15.03 | 40.84 | 4.13% | 14.72% |
| 11a | Stripper | 5:45 p | 0.09 | 0.03 | 81.61 | 3.20 | 32.64 | 3.29% | 3.92% |
| 11a | Stripper | 5:45 p | −0.01 | 0.03 | 79.06 | 3.16 | 31.62 | 3.19% | 4.00% |
| 12a | Top | 5:45 p | −0.01 | 0.03 | 1604.05 | 102.56 | 641.62 | 77.45% | 6.39% |
| 12b | Top | 5:45 p | −0.01 | 0.03 | 1643.05 | 102.73 | 657.22 | 79.74% | 6.25% |
| 13a | Bottom | 5:45 p | 1.27 | 0.05 | 16.79 | 0.49 | 6.72 | 0.67% | 2.92% |
| 13b | Bottom | 5:45 p | −0.01 | 0.03 | 15.88 | 0.49 | 6.35 | 0.64% | 3.07% |

Figure 14:
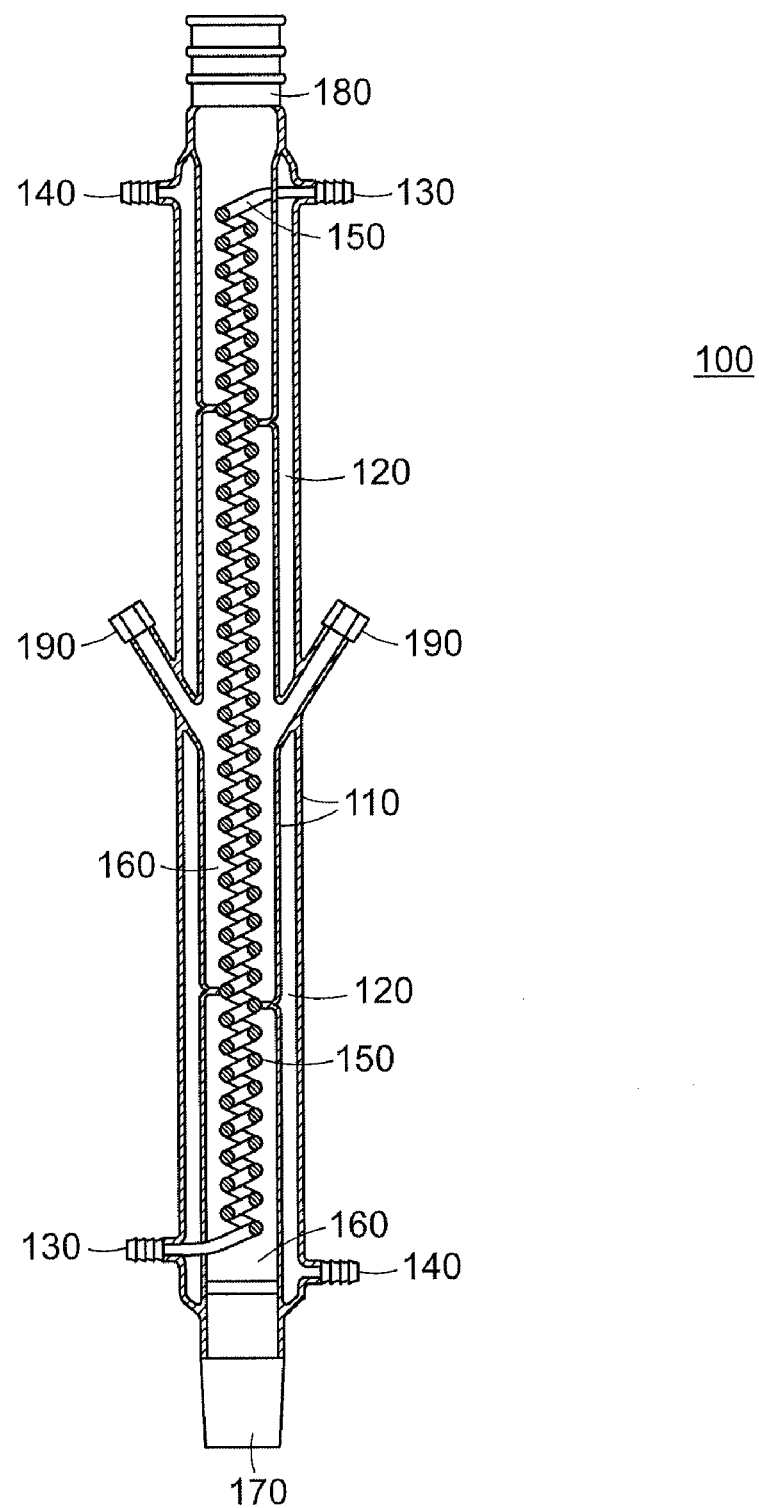
FIG. 14 is a perspective view of a fractional condensation column.

FIG. 14 shows an example of a fractional condensation apparatus, and, more specifically, a modular fractional condensation column 100. The fractional condensation column includes a column jacket 110 providing the structural enclosure of the column. The column jacket includes a column jacket volume 120, which can extend around the circumferfrom the fractional condensation volume. Optionally, the fractional condensation column can include monitoring well(s) 190 (e.g., in the middle of the column) that are open to the center of the column for monitoring temperature, pressure, pH and other operating parameters, as well as for sampling, feeding, or taking side line products. Typically, during vapor feed operation of the column shown in FIG. 14, a cooling stream enters from the top right inlet 130, flows down the central cooling coil 150 to provide cooling duty to condense vapor that is rising from a lower part of the column or a lower module (in case of a multi-sectional modular distillation system), or from a reboiler. The cooling stream typically exits the module from the bottom left side outlet 130. Also, typically, another cooling stream enters the module from the top left column jacket inlet 140 into the jacket volume and, after heat exchange, the cooling stream exits the column from the bottom right outlet 140 of the module.

A further specific embodiment of the present invention is a process for recovering a volatile organic compound from a feed mixture. The process includes (a) fractionally condensing the feed mixture in a fractional condensation apparatus to form a first condensed fluid, the feed mixture having a temperature between 35° C. and 38° C. before fractional condensing; (b) condensing the first condensed fluid in a top condenser to form a second condensed fluid, the top condenser having a temperature between 6° C. and 14° C.; and (c) condensing the second condensed fluid in a product condenser to form a cold product stream, the product condenser having a temperature that is below the temperature of the top condenser; wherein the feed mixture contains between 1 mol % and 5 mol % of the volatile organic compound, at least 5 mol % water, and at least 90 mol % gases selected independently from the group consisting of $N_2$, $O_2$ and $CO_2$, and the cold product stream contains at least 80 wt % of the volatile organic compound. The fractional condensation apparatuses comprises (a) an enclosure providing a fractional condensation volume for the mixture, the enclosure having an internal surface in contact with the fractional condensation volume, wherein the temperature of the internal surface is controllable, and the enclosure having an inlet adapted for receiving the feed mixture and an outlet for providing recovered compound; (b) a second surface positioned centrally within the fractional condensation volume, wherein the temperature of the second surface is controllable; and (c) first packing material between the internal surface and the second surface. Alternatively, the fractional condensation apparatus is a fractional condensation column comprising (a) a column jacket; (b) a fluid tube positioned centrally within the column and along the length of the column; and (c) first packing material between the column jacket and the fluid tube. Even further alternatively, the fractional condensation apparatus is a multi-sectional modular distillation system having a plurality of fractional condensation columns as described above connected in series to allow flow of the feed mixture through the apparatuses.

A further specific embodiment of the present invention is a process for recovering a volatile organic compound from a feed mixture, The process includes (a) fractionally condensing the feed mixture in a fractional condensation apparatus to form a first condensed fluid, the feed mixture having a temperature between 35° C. and 38° C. before fractional condensing; (b) condensing the first condensed fluid in a top condenser to form a second condensed fluid, the top condenser having a temperature between 6° C. and 14° C.; and (c) condensing the second condensed fluid in a product condenser to form a cold product stream, the product condenser having a temperature that is below the temperature of the top condenser; wherein the feed mixture contains between 1 mol % and 3 mol % of the volatile organic compound, at least 5 mol % water, and at least 80 mol % gases selected independently from the group consisting of $N_2$, $O_2$ and $CO_2$, and the cold product stream contains at least 80 wt % of the volatile organic compound. The fractional condensation apparatuses comprises (a) an enclosure providing a fractional condensation volume for the mixture, the enclosure having an internal surface in contact with the fractional condensation volume, wherein the temperature of the internal surface is controllable, and the enclosure having an inlet adapted for receiving the feed mixture and an outlet for providing recovered compound; (b) a second surface positioned centrally within the fractional condensation volume, wherein the temperature of the second surface is controllable; and (c) first packing material between the internal surface and the second surface. Alternatively, the fractional condensation apparatus is a fractional condensation column comprising (a) a column jacket; (b) a fluid tube positioned centrally within the column and along the length of the column; and (c) first packing material between the column jacket and the fluid tube. Even further alternatively, the fractional condensation apparatus is a multi-sectional modular distillation system having a plurality of fractional condensation columns as described above connected in series to allow flow of the feed mixture through the apparatuses.

A further specific embodiment is a process for recovering a volatile organic compound from a feed mixture comprising: (a) fractionally condensing the feed mixture in a fractional condensation apparatus to form a first condensed fluid, the feed mixture having a temperature between 30° C. and 60° C. before fractional condensing; (b) condensing the first condensed fluid in a top condenser to form a second condensed fluid, the top condenser having a temperature between 6° C. and 11° C.; and (c) condensing the second condensed fluid in a product condenser to form a cold product stream, the product condenser having a temperature that is below the temperature of the top condenser; wherein the feed mixture contains between 1 mol % and 5 mol % of the volatile organic compound, at least 5 mol % water, and at least 80 mol % gases selected independently from the group consisting of $N_2$, $O_2$ and $CO_2$, and the cold product stream contains at least 80 wt % of the volatile organic compound.

A further specific embodiment is a process for recovering a volatile organic compound from a feed mixture comprising (a) fractionally condensing the feed mixture in a fractional condensation apparatus to form a first condensed fluid, the feed mixture having a temperature of at least 50° C. before fractional condensing; (b) condensing the first condensed fluid in a top condenser to form a second condensed fluid, the top condenser having a temperature between 6° C. and 11° C.; and (c) condensing the second condensed fluid in a product condenser to form a cold product stream, the product condenser having a temperature that is below the temperature of the top condenser; wherein the feed mixture contains between 1 mol % and 5 mol % of the volatile organic compound, at least 5 mol % water, and at least 80 mol % gases selected independently from the group consisting of $N_2$, $O_2$ and $CO_2$, and the cold product stream contains at least 80 wt % of the volatile organic compound.

It has been found that cooling by both internal coil and external jacket ensures a significantly better temperature profile along the column as compared to a single condenser column.

Further, it has been found that inclusion of packing material between the internal coil and the external jacket allows for temperature control within the fractional distillation volume both, across and along the column, thereby allowing to achieve even better temperature profiles along the column while, at the same time, significantly increasing mass transfer characteristics of the column.

The fractional distillation column shown in FIG. 14 is modular, that is, allows integration of a plurality of these columns into a multi-sectional modular distillation system. The modular integration capability allows the building of numerous column configurations and associated operating conditions with different performance targets to handle variable systems, feed compositions, design specifications, temperature, pressure, pH, and other operation parameter specifications.

In various aspects, the invention provides a modular packed multi-purpose distillation system for both batch and continuous separation processes, providing flexibility for expanding or shrinking the rectifying and stripping sections with multiple feeding points along the sectioned column as well as the option of applying cooling or heating in certain modular sections as needed.

In further aspects, the invention provides a packed fractional condensation distillation device that is modular, scalable and regulates temperature. In preferred aspects, the modules are connected to each other to increase or decrease the column length for desired separation.

The apparatuses and systems of the present invention are suitable for laboratory, pilot plant, and commercial applications to meet flexible mass and heat transfer requirements. The modular fractional distillation column system can be applied to separate mixtures with both narrow and wide boiling point ranges, for example, systems like alcohols, hydrocarbons, biodiesels, and chemicals.

Various packing materials are suitable for the column. For example, columns can be packed with 3 mm solid glass beads from Wilmad Glass Inc. Jacket packing can be with 1 mm solid glass beads from Cole Palmer. The packing materials can be supported by a perforated plate.

In typical embodiments, the apparatuses and columns include wells in each module that allow access to the fractional condensation volume (typically, to the center of the column) for monitoring temperature, pressure, pH and other operating parameters, as well as for sampling, feeding, or taking side line products.

The fractional condensation apparatuses, columns and systems of the present invention can also be used for reactive distillation. Accordingly, the present invention also provides reactive distillation apparatuses, columns and systems including multi-sectional modular reactive distillation apparatuses. The temperature profile along the fractional condensation volume can be controlled to achieve one or more reaction zones in which one or more reactants provided as part of a feed mixture and/or provided separately (e.g., as a separate stream entering the fraction condensation through a separate inlet) react to form one or more products that are concurrently, and, optionally, independently recovered.

The integration of the modules into a multi-sectional modular distillation system allows the building of numerous column configurations and operating conditions with different performance targets to handle variable systems, feed compositions, design specifications, temperature, pressure, pH, and other operation parameter specifications.

In preferred embodiments, the apparatuses and systems of the present invention can be structurally adapted to allow taking side products at multiple points along the fractional condensation volume.

The relevant teachings of all patents, published patent applications and literature references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A process for recovering ethanol from a feed mixture comprising:
   (a) introducing the feed mixture into a fractional condensation apparatus;
   (b) fractionally condensing the feed mixture in the fractional condensation apparatus to form a first condensed fluid and a first vapor, the feed mixture having a temperature between about 30° C. and about 60° C. before fractional condensing;
   (c) condensing the first vapor in a top condenser to form a second condensed fluid and a second vapor, the top condenser having a temperature between about 6° C. and about 11° C.; and
   (d) condensing the second vapor in a product condenser to form a cold product stream, the product condenser having a temperature that is below the temperature of the top condenser;
   wherein the feed mixture contains between about 1 mol % and about 5 mol % of ethanol, at least about 5 mol % water, and at least about 90 mol % gases selected independently from the group consisting of $N_2$, $O_2$ and $CO_2$, or mixtures thereof; whereby a concentration of ethanol in the cold product stream of at least about 80 wt % and a recovery of at least about 60 wt % is obtained.

2. The process of claim 1, wherein the top condenser is an integral part of the fractional condensation apparatus.

3. The process of claim 1, wherein the feed mixture is a vapor feed with a concentration of ethanol of between about 1.0 and about 3.0 mol % and a temperature of between about 37° C. and about 38° C. before fractional condensing, and the top condenser has a temperature between about 6° C. and about 9° C.

4. The process of claim 1, wherein the feed mixture is a vapor feed with a concentration of the ethanol of between about 1.0 and about 3.0 mol % and a temperature of between about 54° C. and about 56° C. before fractional condensing, and the top condenser has a temperature between about 7° C. and about 11° C.

5. The process of claim 1, wherein the feed mixture is a vapor feed with a concentration of ethanol of between about 1.5 mol % and about 2.5 mol % and a temperature of between about 37° C. and about 38° C. before fractional condensing, the top condenser has a temperature between about 6° C. and about 9° C., the method further comprising providing a total cooling duty of not more than (PEU) 6 MJ/kg ethanol to recover the ethanol with a concentration of at least about 80 wt % in the product stream and a recovery of at least about 90 wt %.

6. The process of claim 1, wherein the feed mixture is a vapor feed with a concentration of ethanol of between about 1.5 mol % and about 2.5 mol % and a temperature of between about 55° C. and about 56° C. before fractional condensing, the top condenser has a temperature between about 7.5° C. and about 9.5° C., the method further comprising providing a total cooling duty of not more than (PEU) 8 MJ/kg ethanol to recover the ethanol with a concentration of at least about 80 wt % in the product stream and a recovery of at least about 90 wt %.

7. The process of claim 1, wherein the feed mixture is a vapor feed with a concentration of ethanol of between about 1.5 mol % and about 2.5 mol % and a temperature of between about 37° C. and about 38° C. before fractional condensing, the top condenser has a temperature between about 7° C. and about 8° C., the method further comprising providing a total cooling duty of not more than (PEU) 6 MJ/kg ethanol to recover the ethanol with a concentration of at least about 85 wt % and a recovery of at least about 95 wt %.

8. The process of claim 1, wherein the product condenser has a temperature of between about −25° C. and about −45° C.

9. The process of claim 1, wherein the product condenser has a temperature of about −35° C.

10. The process of claim 1, wherein the product condenser further produces a cold vent stream, and the method further comprises heating the cold product stream and the cold vent stream by providing cooling duty to the fractional condensation apparatus.

11. The process of claim 1, wherein the fractional distillation apparatus has a temperature profile from entry of the feed mixture to exit of the first condensed fluid which is controlled to improve recovery and concentration of the volatile organic compound in the product stream.

\* \* \* \* \*